US012572876B2

(12) United States Patent (10) Patent No.: US 12,572,876 B2
Mochty et al. (45) Date of Patent: Mar. 10, 2026

(54) SYSTEM AND METHOD FOR OBTAINING AUDIT EVIDENCE

(71) Applicant: EY GmbH & Co. KG Wirtschaftsprufungsgesellschaft, Stuttgart (DE)

(72) Inventors: Ludwig Mochty, Essen (DE); Michael Wiese, Essen (DE)

(73) Assignee: EY GmbH & Co. KG Wirtschaftsprüfungsgesellschaft, Stuttgart (DE)

( * ) Notice: Subject to any disclaimer, the term of this patent is extended or adjusted under 35 U.S.C. 154(b) by 0 days.

(21) Appl. No.: 17/427,201

(22) PCT Filed: Jan. 31, 2020

(86) PCT No.: PCT/IB2020/050733
§ 371 (c)(1),
(2) Date: Jul. 30, 2021

(87) PCT Pub. No.: WO2020/157689
PCT Pub. Date: Aug. 6, 2020

(65) Prior Publication Data
US 2022/0351112 A1     Nov. 3, 2022

(30) Foreign Application Priority Data
Jan. 31, 2019   (GB) ...................................... 1901355

(51) Int. Cl.
*G06Q 10/0639*     (2023.01)
*G06Q 10/04*       (2023.01)
(52) U.S. Cl.
CPC ....... *G06Q 10/06395* (2013.01); *G06Q 10/04* (2013.01)
(58) Field of Classification Search
None
See application file for complete search history.

(56) References Cited

U.S. PATENT DOCUMENTS 6,731,990 B1 *   5/2004   Carter .................. G05B 13/026
                                            700/52
7,296,192 B2 *  11/2007   Breitling ................ G06Q 10/00
                                            714/49
(Continued)

FOREIGN PATENT DOCUMENTS

EP          3101560 A1    12/2016
WO      2015179778 A1     11/2015

OTHER PUBLICATIONS

MacGregor, John F., and Theodora Kourti. "Statistical process control of multivariate processes." Control engineering practice 3.3 (1995): 403-414 (Year: 1995).*
Gillett, Peter R., and Marietta Peytcheva. "The Effect of Stopping Rules on the Evaluation of Audit Evidence." Available at SSRN 964995 (2007) (Year: 2007).*
(Continued)

*Primary Examiner* — Darlene Garcia-Guerra
(74) *Attorney, Agent, or Firm* — Kevin J Fournier Intellectual Property Legal Services Ltd.; Kevin J Fournier

(57)     ABSTRACT

There is provided a system that, when in operation, obtains audit evidence, wherein the system comprises a sewer arrangement (102) that is configured to: (a) obtain input data pertaining to a given use case for which the audit evidence is to be obtained, wherein the input data is in a time structured form; (b) validate the input data; (c) provide user with interactive user interface to enable the user to input plurality of audit parameters, such audit parameters comprising at least one of: assurance level, tolerable error, statistical sampling technique, time period, level of data aggregation; (d) generate time series chart and identify upper acceptance bound and lower acceptance bound of data points in time series chart; (e) identify key items that are required to be tested, the key items being samples that fall outside the upper acceptance bound and the lower acceptance bound in the time series chart.

3 Claims, 6 Drawing Sheets

(56) References Cited

U.S. PATENT DOCUMENTS

| | | | | |
|---|---|---|---|---|
| 10,296,187 B1* | 5/2019 | Gregg | .................. | G06F 3/04842 |
| 10,521,752 B1* | 12/2019 | Williamson | ... | G06Q 10/063112 |
| 2004/0138933 A1* | 7/2004 | LaComb | .......... | G06Q 10/06393 |
| | | | | 705/7.41 |
| 2005/0004781 A1* | 1/2005 | Price | ...................... | G06Q 10/06 |
| | | | | 702/188 |
| 2005/0182655 A1* | 8/2005 | Merzlak | .................. | G16H 50/70 |
| | | | | 705/2 |
| 2007/0156495 A1* | 7/2007 | King | ...................... | G06Q 40/08 |
| | | | | 705/7.38 |
| 2007/0226211 A1* | 9/2007 | Heinze | .................... | G06F 16/93 |
| 2008/0004829 A1* | 1/2008 | Gorin | ................. | G05B 23/0256 |
| | | | | 702/108 |
| 2008/0016490 A1* | 1/2008 | Pabalate | ................ | G06Q 10/10 |
| | | | | 717/100 |
| 2008/0027860 A1* | 1/2008 | Mullen | .................. | G06Q 20/04 |
| | | | | 705/39 |
| 2009/0055270 A1* | 2/2009 | Magdon-Ismail | .... | G06F 16/957 |
| | | | | 705/14.27 |
| 2010/0287011 A1* | 11/2010 | Muchkaev | ............ | A63F 13/792 |
| | | | | 706/45 |
| 2012/0259583 A1* | 10/2012 | Noboa | .............. | H02J 13/00016 |
| | | | | 702/179 |
| 2015/0160953 A1* | 6/2015 | Kienle | ................. | G05B 19/042 |
| | | | | 713/100 |
| 2017/0161643 A1* | 6/2017 | Hoover | .................... | G06F 16/26 |
| 2019/0378397 A1* | 12/2019 | Williams, II | .......... | G06N 5/043 |
| 2020/0058381 A1* | 2/2020 | Patel | ...................... | G16H 10/60 |

OTHER PUBLICATIONS

Alles, Michael, et al. "Continuous monitoring of business process controls: A pilot implementation of a continuous auditing system at Siemens." International Journal of Accounting Information Systems 7.2 (2006): 137-161 (Year: 2006).*

Dowling, Carlin, and Stewart Leech. "Audit support systems and decision aids: Current practice and opportunities for future research." International Journal of Accounting Information Systems 8.2 (2007): 92-116 (Year: 2007).*

Even, Adir, Ganesan Shankaranarayanan, and Paul D. Berger. "Evaluating a model for cost-effective data quality management in a real-world CRM setting." Decision Support Systems 50.1 (2010): 152-163 (Year: 2010).*

Livshitz, Ilya I., et al. "The optimization of the integrated management system audit program." 2016 IEEE Conference on Quality Management, Transport and Information Security, Information Technologies (IT&MQ&IS). IEEE, 2016 (Year: 2016).*

Jian Zhao et al., published "Exploratory Analysis of Time-Series with ChronoLenses" in IEEE Transactions on Visualization and Computer Graphics, vol. 17, No. 12, on Dec. 1, 2011, pp. 2422-2431.

International Search Report and Written Opinion of the International Searching Authority mailed in International Patent Application No. PCT/IB2020/050733 on Jun. 4, 2020, 14 pages.

International Preliminary Report on Patentability mailed in International Patent Application No. PCT/IB2020/050733 on Aug. 12, 2021, 11 pages.

* cited by examiner

FORECAST TIME SERIES CHART

INPUTS

ASSURANCE LEVEL TO BE ACHIEVED (IN %)

---  ▽

0%                                      100%

CRA:                          TOLERABLE ERROR:

MODERATE        ▽            1.200

SAMPLING TECHNIQUE:

MUS        ▽

AUDIT START TIME:            AUDIT END TIME:

2014.01        ▽            2015.12        ▽

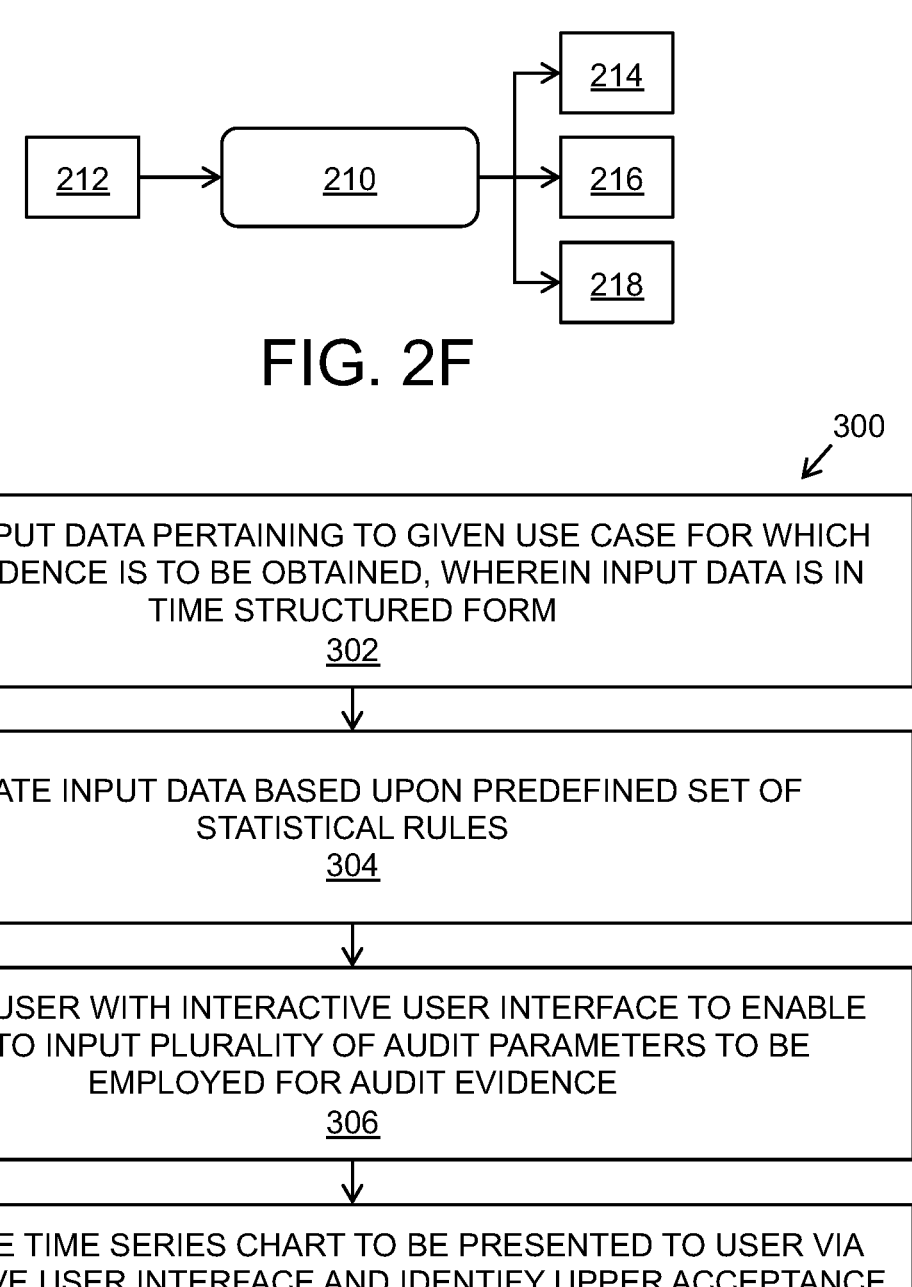

OBTAIN INPUT DATA PERTAINING TO GIVEN USE CASE FOR WHICH AUDIT EVIDENCE IS TO BE OBTAINED, WHEREIN INPUT DATA IS IN TIME STRUCTURED FORM
302

VALIDATE INPUT DATA BASED UPON PREDEFINED SET OF STATISTICAL RULES
304

PROVIDE USER WITH INTERACTIVE USER INTERFACE TO ENABLE USER TO INPUT PLURALITY OF AUDIT PARAMETERS TO BE EMPLOYED FOR AUDIT EVIDENCE
306

GENERATE TIME SERIES CHART TO BE PRESENTED TO USER VIA INTERACTIVE USER INTERFACE AND IDENTIFY UPPER ACCEPTANCE BOUND AND LOWER ACCEPTANCE BOUND
308

IDENTIFY, FROM AMONGST PLURALITY OF SAMPLES, KEY ITEMS THAT ARE REQUIRED TO BE TESTED
310

FIG. 3

SYSTEM AND METHOD FOR OBTAINING AUDIT EVIDENCE

TECHNICAL FIELD

The present disclosure relates generally to systems that are susceptible to being used for auditing purposes; more specifically, the systems include modules, for example implemented in specially adapted computing hardware, that are configured to provide evaluation and prediction, wherein the modules operate together to process data to obtain audit evidence for example. Moreover, the present disclosure also relates to methods for operating aforesaid systems to provide audit evidence. Moreover, the present disclosure also relates to software products comprising non-transitory machine-readable data storage mediums having stored thereon program instructions, the program instructions being accessible by processing devices to execute the aforementioned methods.

BACKGROUND

Devices and systems that perform computations are known. For example, for a published European patent application EP1505512A2 (applicant Hewlett Packard; "Input and evaluation of fractions using a calculator"), a search was generated as published in EP1505512A3. Clearly, in this example application EP1505512A2, submitted after the Strasbourg Convention 1963 came into force as enshrined in Art. 52(2) EPC, there was assessed to be a technical effect. Moreover, it will be appreciated that novel microprocessor architectures (e.g. from Intel Corp.; EP3552108A1; "Apparatuses and methods for a processor architecture"), for example providing enhanced data processing speed, are susceptible to being protected by patent rights, even if the processors are used for non-technical tasks such as games and Word processing.

In recent years, many patents have been granted for new computing architectures and configurations, irrespective of a wide variety of tasks to which they find use. The advanced computing architectures and configurations process various types of data with increased efficiency therein. Several establishments such as manufacturing units, retailers, banks, money-lenders, currency exchangers, and so forth have come into existence. These establishments perform several financial and non-financial operations and are therefore, required to maintain detailed records pertaining thereto. However, such records need to be verified for accuracy and reliability, by a procedure known as "audit". Typically, audits involve thorough inspection and detailed analysis of records of a given establishment's financial and non-financial operations. Furthermore, such audits need to be done regularly (namely, routinely) in order to maintain reliable financial records, prevent frauds and improve credibility of the given establishment.

Generally, an auditor having knowledge of accounting, business administration, auditing, and the like performs the audit. Notably, the auditor performs audit planning before starting the audit wherein, the audit planning includes two steps: first of assessing the risk of material misstatement and second of responding to those risks by obtaining audit evidence. Specifically, such audit planning helps in development of appropriate audit strategies to be subsequently executed by the auditor. Thus, audit planning forms a crucial part of the audit. Furthermore, the term "audit evidence" relates to all information (such as the records of the given establishment's financial and non-financial operations, information pertaining to the given establishment from other sources, and the like) that is utilized by the auditor to form an audit conclusion.

However, there currently exists several issues associated with obtaining audit evidence.

As an example, sources of information containing comprehensive and diverse audit evidence are disparate and often distributed. Therefore, aggregating and systematically organizing information from such varied sources of information poses a significant challenge pertaining to data acquisition and data recording. Moreover, providing computing hardware that is specifically configured to collate data from disparate and often distributed sources is a technical problem associated with known technical art. Presently, several analytical methods and conventional computing devices are being used by the auditor to obtain audit evidence. Such analytical methods include trend analysis over time, ratio analysis, reasonableness testing and the like. Often, the auditor may employ the time series analysis for:

(i) estimating a sample size of the records that need to be analysed, from among an aggregate data of the records of the given establishment's financial and non-financial operations;

(ii) identifying misstatements within the records of the given establishment's financial and non-financial operations; and (iii) obtaining sufficient and appropriate audit evidence that the financial statements are free from material misstatements.

Specifically, a lack of specially adapted computing devices for performing such aforesaid auditing tasks represents a technical problem that is contemporarily inadequately addressed. Conventionally, the auditor manually carried out the aforesaid analytical methods, based on judgment, which often lead to errors and inaccuracies in the audit planning and a small scale of audit evidence since manual analytical methods are cumbersome and calculation intensive. Furthermore, even when the auditor employed conventional computing hardware for performing the aforesaid analytical methods, the auditor had to undertake substantial manual effort for processing bits and pieces of disparate information.

Therefore, in light of the foregoing discussion, there exists a need to overcome the aforementioned drawbacks associated with specially adapted computing devices that, when in operation, perform audit planning procedures and the procedures for obtaining audit evidence; in particular, there is a need to provide computing systems that are specifically configured to implement collection of audit evidence.

SUMMARY

The present disclosure seeks to provide an improved system that, when in operation, executed time series planning, evaluation and prediction to obtain audit evidence.

The present disclosure also seeks to provide an improved method for (namely, an improved method of) obtaining audit evidence.

The present disclosure also seeks to provide an improved software product comprising non-transitory machine-readable data storage mediums having stored thereon program instructions, the program instructions being accessible by processing device to execute the aforementioned improved method.

The present disclosure seeks to provide a solution to the existing problem of errors and inaccuracies in audit planning and procedures associated with obtaining audit evidence; such removal of errors and inaccuracies corresponds to performing stochastic error reduction in input data provided to the system. An aim of the present disclosure is to provide a solution that overcomes at least partially the problems encountered in prior art, thereby providing a reliable and efficient system for obtaining audit evidence while reducing an intensive calculation burden on an auditor.

In a first aspect, there is provided a system that, when in operation, executes time series planning, evaluation and prediction to obtain audit evidence, the system being automated or semi-automated, and the system comprising a server arrangement that includes a plurality of modules, wherein the modules include:

(a) a data input module that, when in operation, obtains input data pertaining to a given use case for which the audit evidence is to be obtained, wherein the input data is in a time structured form, and wherein the input data comprises data values of a set of variables for a plurality of samples associated with the given use case;

(b) a validation module that, when in operation, validates the input data based upon a predefined set of statistical rules;

(c) an interactive user interface module that, when in operation, provides a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(d) a data analysis module that, when in operation, generates a time series chart to be presented to the user via the interactive user interface and identify an upper acceptance bound and a lower acceptance bound of data points in the time series chart, the time series chart representing a variation in a response variable with respect to time, wherein the time series chart is to be generated for the plurality of samples, and wherein the upper acceptance bound and the lower acceptance bound are to be identified based upon the plurality of audit parameters and at least one explanatory variable; and (e) an identification module that, when in operation, identifies, from amongst the plurality of samples, key items that are required to be tested, the key items being samples that fall outside the upper acceptance bound and the lower acceptance bound in the time series chart.

The invention is of advantage in that the modules of the server arrangement mutually interact to reduce stochastic error in the input data provided to the system, thereby reducing auditing workload. It will be appreciated that the modules can be implemented in specialist hardware, as elucidated in greater detail below, in software, or a combination of software and specialist hardware.

In a second aspect, there is provided a method for obtaining audit evidence, the method comprising using a system that, when in operation, provides automated or semi-automated time series planning, evaluation and prediction, wherein the method includes:

(i) using a data input module of the system to obtain input data pertaining to a given use case for which the audit evidence is to be obtained, wherein the input data is in a time structured form, and wherein the input data comprises data values of a set of variables for a plurality of samples associated with the given use case;

(ii) using a validation module to validate the input data based upon a predefined set of statistical rules;

(iii) using an interactive user interface module to provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(iv) using a data analysis module to generate a time series chart to be presented to the user via the interactive user interface module and identifying an upper acceptance bound and a lower acceptance bound of data points in the time series chart, wherein the time series chart represents a variation in a response variable with respect to time, wherein the time series chart is generated for the plurality of samples, the upper acceptance bound and the lower acceptance bound being identified based upon the plurality of audit parameters and at least one explanatory variable; and (v) using a data analysis module to identify, from amongst the plurality of samples, key items that are required to be tested, the key items being samples that fall outside the upper acceptance bound and the lower acceptance bound in the time series chart.

In yet another aspect, an embodiment of the present disclosure provides a software product comprising a non-transitory machine-readable data storage medium having stored thereon program instructions that, when accessed by a processing device, cause the processing device to:

(a) obtain input data pertaining to a given use case for which the audit evidence is to be obtained, wherein the input data is in a time structured form, and wherein the input data comprises data values of a set of variables for a plurality of samples associated with the given use case;

(b) validate the input data based upon a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(d) generate a time series chart to be presented to the user via the interactive user interface and identify an upper acceptance bound and a lower acceptance bound of data points in the time series chart, the time series chart representing a variation in a response variable with respect to time, wherein the time series chart is to be generated for the plurality of samples, and wherein the upper acceptance bound and the lower acceptance bound are to be identified based upon the plurality of audit parameters and at least one explanatory variable; and (e) identify, from amongst the plurality of samples, key items that are required to be tested, the key items being samples that fall outside the upper acceptance bound and the lower acceptance bound in the time series chart.

Embodiments of the present disclosure substantially eliminate or at least partially address the aforementioned problems in the prior art, and provide a reliable and efficient system and method for obtaining audit evidence.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 2A, 2B, 2C, 2D, 2E and 2F illustrate exemplary time series planning, evaluation and prediction information that can be represented via an interactive user interface, in accordance with an embodiment of the present disclosure; and FIG. 3 illustrates steps of a method of obtaining audit evidence, in accordance with an embodiment of the present disclosure.

Figure 1A:
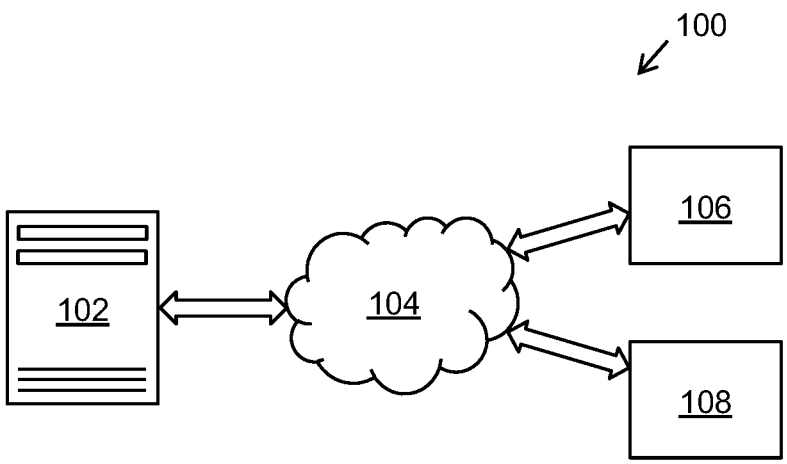
FIGS. 1A and 1B are schematic illustrations of a network environment wherein a system is implemented that, when operation, performs time series planning, evaluation and prediction, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system that, when in operation, executes time series planning, evaluation and prediction to obtain audit evidence, the system being automated or semi-automated, and the system comprising a server arrangement that includes a plurality of modules, wherein the modules include:

(a) a data input module that, when in operation, obtains input data pertaining to a given use case for which the audit evidence is to be obtained, wherein the input data is in a time structured form, and wherein the input data comprises data values of a set of variables for a plurality of samples associated with the given use case;

(b) a validation module that, when in operation, validates the input data based upon a predefined set of statistical rules;

(c) an interactive user interface module that, when in operation, provides a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(d) a data analysis module that, when in operation, generates a time series chart to be presented to the user via the interactive user interface and identify an upper acceptance bound and a lower acceptance bound of data points in the time series chart, the time series chart representing a variation in a response variable with respect to time, wherein the time series chart is to be generated for the plurality of samples, and wherein the upper acceptance bound and the lower acceptance bound are to be identified based upon the plurality of audit parameters and at least one explanatory variable; and (e) an identification module that, when in operation, identifies, from amongst the plurality of samples, key items that are required to be tested, the key items being samples that fall outside the upper acceptance bound and the lower acceptance bound in the time series chart.

In another aspect, the present disclosure provides a method for obtaining audit evidence, the method comprising using a system that, when in operation, provides automated or semi-automated time series planning, evaluation and prediction, wherein the method includes:

(i) using a data input module of the system to obtain input data pertaining to a given use case for which the audit evidence is to be obtained, wherein the input data is in a time structured form, and wherein the input data comprises data values of a set of variables for a plurality of samples associated with the given use case;

(ii) using a validation module to validate the input data based upon a predefined set of statistical rules;

(iii) using an interactive user interface module to provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(iv) using a data analysis module to generate a time series chart to be presented to the user via the interactive user interface module and identifying an upper acceptance bound and a lower acceptance bound of data points in the time series chart, wherein the time series chart represents a variation in a response variable with respect to time, wherein the time series chart is generated for the plurality of samples, the upper acceptance bound and the lower acceptance bound being identified based upon the plurality of audit parameters and at least one explanatory variable; and (v) using a data analysis module to identify, from amongst the plurality of samples, key items that are required to be tested, the key items being samples that fall outside the upper acceptance bound and the lower acceptance bound in the time series chart.

In yet another aspect, an embodiment of the present disclosure provides a software product comprising a non-transitory machine-readable data storage medium having stored thereon program instructions that, when accessed by a processing device, cause the processing device to:

(a) obtain input data pertaining to a given use case for which the audit evidence is to be obtained, wherein the input data is in a time structured form, and wherein the input data comprises data values of a set of variables for a plurality of samples associated with the given use case;

(b) validate the input data based upon a predefined set of statistical rules;

(c) provide a user with an interactive user interface to enable the user to input a plurality of audit parameters to be employed for the audit evidence, the plurality of audit parameters comprising at least one of: an assurance level to be achieved, a tolerable error, a statistical sampling technique to be employed, a time period for which audit evidence is to be obtained, a level of data aggregation;

(d) generate a time series chart to be presented to the user via the interactive user interface and identify an upper acceptance bound and a lower acceptance bound of data points in the time series chart, the time series chart representing a variation in a response variable with respect to time, wherein the time series chart is to be generated for the plurality of samples, and wherein the upper acceptance bound and the lower acceptance bound are to be identified based upon the plurality of audit parameters and at least one explanatory variable; and (e) identify, from amongst the plurality of samples, key items that are required to be tested, the key items being samples that fall outside the upper acceptance bound and the lower acceptance bound in the time series chart.

The present disclosure provides the aforementioned system, the aforementioned method, and the aforementioned software product of obtaining audit evidence. Beneficially, the method described herein allows for obtaining the audit evidence in a reliable manner with high efficiency and accuracy. The method is implemented by way of the automated or semi-automated system that, when in operation, executes time series planning, evaluation and prediction, thereby allowing for substantial reduction of intensive calculation burden on the user (namely, an auditor). As a result of being implemented on powerful processing hardware, the process of obtaining audit evidence is quick and user-friendly. Furthermore, the automated or semi-automated system provides processing functionality that enables efficient data aggregation from disparate information sources, as well as quick and systematic organization of such data. Furthermore, the time series analysis performed for obtaining the audit evidence can also be easily related to statistical mechanisms of an audit risk model, for audit procedures that are to be conducted by the user. Moreover, the system provides efficient results associated with prediction of the response variable for a future time period. Notably, the time series analysis is performed digitally using processing hardware, for example implemented using one or more high-speed reduced instruction set (RISC) processors, and using specially adapted processing hardware using field-programmable gate arrays (FPGA) or similar customized integrated circuits, and can therefore be seamlessly integrated into digital solutions that prepare the audit risk model. Therefore, by employing the automated or semi-automated system, the user's effort in obtaining audit evidence is considerably reduced. The time series analysis, for example, is implemented in a time series module that is added the server arrangement (namely, a data processing arrangement), with corresponding software that operates to enable the time series module to exchange data with the data processing arrangement for example, the time series module is implemented using one or more high-speed reduced instruction set (RISC) processors, and using specially adapted processing hardware using field-programmable gate arrays (FPGA) or similar customized integrated.

It will be appreciated that the aforesaid time series planning, evaluation and prediction system and the aforesaid method are not limited to obtaining the audit evidence for only a single use case and can be employed to obtain audit evidences for a plurality of use cases (namely, multiple use cases). In such a case, the aforesaid steps (a) to (e) are implemented for each use case of the plurality of use cases.

The aforesaid method uses the automated or semi-automated system to obtain the audit evidence. In one embodiment, the system is automated (namely, fully autonomous). In such a case, the user of the system operates the system in a manner that the aforesaid steps (a) to (e) are entirely implemented at the system. In another embodiment, the system is semi-automated (namely, semi-autonomous). In a first case, when the system is semi-automated, the user of the system operates the system in a manner that at least one of the aforesaid steps (a) to (e) are implemented by the user. As an example, the step (a) is performed manually by the user, and the user inputs (namely, enters) such obtained input data, into the system. In a second case, when the system is semi-automated, the user of the system manually verifies (namely, double checks) the key items identified by the system.

Optionally, the user is a person having knowledge pertaining to at least one of: finance, accounting, business administration, auditing. Optionally, in this regard, the user is an independent auditor, an internal auditor employed by an entity being audited, or an auditor employed by at least one firm offering audit services. Such an auditor may or may not be certified by at least one regulatory authority of auditing.

Throughout the present disclosure, the term "server arrangement" relates to an arrangement of at least one server that, when operated, performs the aforementioned steps (a) to (e) to obtain the audit evidence. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. The server arrangement beneficially includes one or more modules, for example implemented in custom-designed hardware, software, or a combination of custom-designed hardware and software.

For illustration purposes only, there will now be considered an exemplary network environment, wherein the system is implemented pursuant to embodiments of the present disclosure. One such network environment has been illustrated in conjunction with FIG. 1 as explained in more detail hereinafter. The exemplary network environment includes a source of the input data pertaining to the given use case, a user device associated with the user of the automated or semi-automated system, the server arrangement including the at least one server, and the communication network. Notably, the server arrangement is coupled in communication with the source of the input data either directly, or via the communication network. Furthermore, in the exemplary network environment, the server arrangement is be coupled in communication with the user device via the communication network. In such a case, the user device can be understood to be the "client" for the server arrangement. It is to be noted here that the server arrangement is optionally coupled in communication with a plurality of user devices associated with a plurality of users. Examples of the user device include, but are not limited to, a mobile phone, a smart telephone, a Mobile Internet Device (MID), an Ultra-Mobile Personal Computer (UMPC), a phablet computer, a Personal Digital Assistant (PDA), a web pad, a Personal Computer (PC), a handheld PC, a laptop computer, a tablet computer, and a desktop computer.

It will be appreciated that the aforementioned server arrangement can be implemented in several ways. In an example, the entire server arrangement can be directly coupled in communication with a given user device associated with a given user, via the communication network. In such an example implementation, the entire server arrangement can be accessed by the given user using the given user device, via the communication network. In another example, the server arrangement can have a distributed architecture wherein the server arrangement comprises a plurality of servers that are coupled in communication with a given user device associated with a given user, via the communication network. In such an example implementation, there can be a first server (namely, a "front-end server") that is directly coupled in communication with the given user device, and at least one server (namely, at least one "back-end server") that is coupled in communication to the first server. In operation, the first server can be accessed by the given user using the given user device, via the communication network. Furthermore, in such a case, the at least one back-end server, either alone, or in combination with the front-end server, could implement the aforesaid steps (a) to (e). In yet another example, server arrangement could be implemented by way of a cloud server arrangement. Beneficially, the servers include one or more modules that are configured to perform specific types of functions, for example to receive input data, to perform data analysis, to perform interfacing with the given user, and so forth. The one or more modules are implemented, for example, in custom-designed hardware, for example using custom-design integrated circuits, FPGA's and so forth. Such specialist modules allow for more rapid data analysis and stochastic noise reduction in data to be processed.

Optionally, the server arrangement is coupled in communication with a time series analysis module for performing time series analysis operations, and wherein the time series analysis module is implemented by employing a configuration of field-programmable gate arrays (FPGAs) and reduced instruction set (RISC) computers. Therefore, the time series analysis module can be understood to be a custom computing hardware that is configured to perform the time series analysis operations described throughout the present disclosure.

In an example embodiment, the source of the input data is at least one entity device associated with an entity, the entity being associated with the given use case for which the audit evidence is to be obtained. Optionally, the entity is an organisation (namely, an establishment, a firm or a company) being audited. Examples of the at least one entity device include, but are not limited to, a mobile phone, a smart telephone, a Mobile Internet Device (MID), an Ultra-Mobile Personal Computer (UMPC), a phablet computer, a Personal Digital Assistant (PDA), a web pad, a Personal Computer (PC), a handheld PC, a laptop computer, a tablet computer, and a desktop computer. In another embodiment, the source of the input data is a database arrangement comprising at least one database, the database arrangement being configured to store thereupon, the input data pertaining to the given use case for which the audit evidence is to be obtained. Optionally, the database arrangement obtains the input data pertaining to the given use case for which the audit evidence is to be obtained, from the at least one entity device associated with the entity. In such a case, the database arrangement acts as a data repository whereat the input data is stored. It is to be understood that the term "database" generally refers to hardware, software, firmware, or a combination of these for storing information in an organized (namely, structured) manner, thereby, allowing for easy storage, access (namely, retrieval), updating and analysis of such information. The term "database" also encompasses database servers that provide the aforesaid database services to the automated or semi-automated time series planning, evaluation and prediction system.

At (a), the automated or semi-automated system is used to obtain the input data pertaining to the given use case for which the audit evidence is to be obtained. In an embodiment, the server arrangement directly obtains the input data pertaining to the given use case, from the source of the input data. In another embodiment, the server arrangement indirectly obtains the input data pertaining to the given use case. In such a case, the user manually obtains the input data pertaining to the given use case, from the source of the input data, and subsequently inputs (namely, enters) the obtained input data into the server arrangement.

The input data is in the time structured form. Notably, the input data is arranged (namely, structured) with respect to time. Furthermore, the input data has information about the time to which the input data is related. Moreover, the information about the time is available in form of a sequence of characters for example, such as a time stamp. In an example, the time stamp associated with the input data may include information related to a given time and a given date to which the input data is related.

Optionally, the input data is arranged (namely, structured) according to an increasing and/or decreasing order of time. In an example, the input data can be arranged on daily or weekly basis. In another example, the input data can be arranged on monthly basis. In yet another example, the input data is arranged on quarterly or yearly basis.

As an example, a given use case relates to financial and accounting items for a given company. In such an example, the input data relates to a set of five variables A1-A5 associated with financial and accounting items for the given company. In such a case, the input data can be structured on monthly basis based upon a given time period for which the audit evidence is to be obtained. Furthermore, the given time period pertains over a period three years for example, such as from January 2014 to December 2016. Moreover, in such an example, the variable A1 includes monthly data related to total revenues of the given company over the given time period, variable A2 includes monthly data related to total expenses of the given company over the given time period, variable A3 includes monthly data related to cost of materials for the given company over the given time period, variable A4 includes monthly data related to personnel expenses of the given company over the given time period and variable A5 includes monthly data related to trade receivables of the given company over the given time period.

The input data comprises the data values of the set of variables for the plurality of samples associated with the given use case. Notably, the input data relates to disaggregated data pertaining to the given use case, such disaggregated data including the data values of the set of variables for:

(i) a portion of an entire population of financial and non-financial records associated with the given use case, or (ii) the entire population of financial and non-financial records associated with the given use case.

As an example, if the entire population of financial and non-financial records associated with the given use case includes 1000 records (namely, 1000 samples), the input data includes the data values of the set of variables for;

(i) a portion of the entire 1000 records, for example, such as 350 records (namely, 350 samples), or (ii) the entire 1000 records (namely, 1000 samples).

Furthermore, the set of variables can be understood to be attributes related to the given use case, and the data values of the set of variables provides financial and/or non-financial information related to the given use case. It will be appreciated that such disaggregated input data allows for substantially reducing computational burden on the automated or semi-automated system that, when in operation, provides time series planning, evaluation and prediction.

As an example, a given use case 'UC' may relate to sales for a given manufacturer. In such an example, the input data relates to disaggregated data that includes data values of a set of eight variables V1-V8 for 36 months (namely, three years) associated with financial and accounting items for the given manufacturer. In other words, for example, the input data comprises the time-structured data values of the set of eight variables V1-V8 for 36 samples associated with the given use case 'UC'. Furthermore, variable V1 is for example rent, variable V2 is for example sales, variable V3 is for example selling area, variable V4 is for example cost of sales, variable V5 is for example an inventory, variable V6 is for example personnel cost, variable V7 is for example total trade profit, and variable V8 is for example a number of customers. Moreover, the data values for a given variable, for example, such as the variable V2 are £51,000; £94,000; £115,000; £103,000; £73,000; £101,500; £109,000; £84,000; £71,000; £118,000; £77,000; £61,500; £105,000; £95,000; £54,000; £121,500; £82,000; £52,000; £58,000; £98,000; £127,000; £88,000; £100,000; £112,000; £89,500; £100,000; £66,000; £125,000; £75,000; £102,000; £77,000; £107,500; £109,500; £84,000; £70,000; and £96,500. Such data values are arranged in increasing order of time, namely, from January 2014, February 2014, March 2014, and so on, until December 2016. Similar data values (with or without units) are obtained corresponding to other variables, for the 36 samples.

Optionally, in the automated or semi-automated system, the server arrangement is configured to represent, via the interactive user interface, the obtained input data. Throughout the present disclosure, the term "interactive user interface" relates to a space that allows for interaction between the user and the time series planning, evaluation and prediction system. Therefore, the term "interactive user interface" can also be referred to as a "human-machine interface". Beneficially, the interactive user interface is implemented using an interactive user interface module of the server arrangement, wherein the interactive user interface module is optionally implemented using custom-design hardware, for example custom-designed integrated circuits or FPGA's. The interactive user interface is generally rendered upon a display screen of the user device and allows for the automated or semi-automated system to receive input(s) from and/or provide output(s) to the user. The aforesaid obtaining and representation of the input data can be understood to pertain to a time series planning operation that is associated with obtaining the audit evidence, and the representation of the obtained input data can be understood to pertain to time series planning information.

Optionally, at the interactive user interface, the obtained input data is represented in form of: a table, an image, or text.

The automated or semi-automated system is used to validate the input data based upon the predefined set of statistical rules. In such an example, the predefined set of statistical rules are employed to validate the input data according to at least one of: data type, data value, data structure, data consistency, data format, data accuracy, and data relevance. It will be appreciated that such validation of the input data allows for ensuring a planned precision level and a planned reliability level of the input data, prior to its processing for obtaining the audit evidence. Notably, the predefined set of statistical rules allows for pre-processing the input data by way of the aforesaid validation operation, in a manner that the input data has a certain level of quality and format that is appropriate for subsequent analysis of the input data for obtaining the audit evidence. Furthermore, such validation of the input data also beneficially allows for reducing audit risk that is associated with known risk factors in generally accepted auditing practices; such reduction in audit risk corresponds to stochastic noise reduction provided by the system. Therefore, validation of the input data is a highly beneficial pre-processing operation that is associated with obtaining the audit evidence. Furthermore, the pre-processing operation can be understood to pertain to the time series planning operation that is associated with obtaining the audit evidence. Therefore, it will be appreciated that the validated input data can be understood to pertain to the time series planning information.

As an example, the server arrangement may validate the input data based upon a set of logical rules that prohibit any data value of any variable to be negative. In such an example, if all the data values of the set of variables for the plurality of samples are non-negative (namely, positive), the entire input data is understood to be validated as being correct and appropriate.

As another example, the server arrangement validates the input data based upon a given time period for which the audit evidence is to be obtained. In such an example, if all the data values of the set of variables for the plurality of samples lies within the given time period, the entire input data is considered to be validated as being correct and appropriate.

Optionally, the predefined set of statistical rules include at least one of: arithmetic rules, logical rules, syntax rules, semantic rules. As an example, an arithmetic rule may specify that data values of a given variable cannot exceed a predefined amount. As another example, a logical rule specifies that none of the data values of the set of variables should be empty. As another example, a syntax rule specifies that a given row of input data corresponding to a given sample associated with the given use case, should include only positive (namely, non-negative) data values of the set of variables for the given sample. As yet another example, a given semantic rule specifies that data values of a given variable must contain at least five characters.

Optionally, in the automated or semi-automated system that provides time series planning, evaluation and prediction, the server arrangement is configured to enable the user to validate the input data, via the interactive user interface.

Alternatively, optionally, in the automated or semi-automated system, the server arrangement is configured to:
- (i) validate the input data based upon the predefined set of statistical rules, and
- (ii) enable the user to validate the input data, via the interactive user interface.

Optionally, in the automated or semi-automated system, the server arrangement is configured to represent, via the interactive user interface, the validated input data. Optionally, in this regard, at the interactive user interface, the validated input data is represented in form of: a table, text, or an image.

Optionally, in the automated or semi-automated system, the server arrangement is configured to enable, via the interactive user interface, the user to reconcile the validated input data to the source from where the input data was obtained at the step (a). In such a case, the user compares the validated input data with the input data stored at the source of the input data, to identify irregularities and inconsistencies therebetween. Beneficially, such a reconciliation operation allows for substantially reducing errors associated with incorrect obtaining of the input data (for example, errors such as duplication of data values within the input data, missing input data values, incorrect formatting of the input data, and the like) and errors associated with incorrect validation of the obtained input data (for example, such as incorrect data values, incorrect data value syntax, inappropriate data values, and the like). Therefore, the aforesaid reconciliation of the input data can be understood to be another pre-processing operation that is associated with obtaining the audit evidence. It will be appreciated that the aforesaid reconciliation operation may be implemented by the user only when the server arrangement enables the user to validate the input data, via the interactive user interface. In instances when the server arrangement validates the input data, the aforesaid reconciliation operation may be implemented automatically by the server arrangement.

Optionally, in the automated or semi-automated system, the server arrangement is configured to represent, via the interactive user interface, a variable summary, wherein the variable summary facilitates the user to reconcile the validated input data to the source from where the input data was obtained, namely at the step (a). Optionally, in this regard, at the interactive user interface, the variable summary is represented in a form of: a table, text, or a list. Furthermore, the variable summary table can be understood to pertain to the time series planning information.

At step (c), the automated or semi-automated system is used to provide the user with the interactive user interface to enable the user to input the plurality of audit parameters to be employed for the audit evidence. Notably, the plurality of audit parameters act as a basis upon which the validated input data is to be analysed (namely, evaluated) for obtaining the audit evidence. Optionally, the automated or semi-automated system enables the user to input the plurality of audit parameters by providing an input area at the interactive user interface. Optionally, in this regard, the input area comprises at least one of: a user-selectable icon, a user-selectable button, an input field, a slider, a dropdown menu.

As mentioned previously, the plurality of audit parameters comprise at least one of: the assurance level to be achieved, the tolerable error, the statistical sampling technique to be employed, the time period for which audit evidence is to be obtained, the level of data aggregation. Throughout the present disclosure, the "assurance level" to be achieved for a given variable relates to a level of confidence that is to be achieved pertaining to accuracy of given data values of the given variable. Therefore, higher the assurance level to be achieved for the given variable, higher the confidence that is to be achieved pertaining to accuracy of given data values of the given variable. In other words, higher the assurance level to be achieved for the given variable, higher the confidence regarding absence of misstatements within the given data values of the given variable. Furthermore, throughout the present disclosure, the "tolerable error" relates to an acceptable amount (namely, measure) by which a given data value of a given variable can vary from its actual (namely, real or true) value, without considerably impacting the audit evidence. In other words, the tolerable error relates to a maximum acceptable error that can be associated with the given data value, without the given data value being considered as a misstatement. Moreover, throughout the present disclosure, the "statistical sampling technique to be employed" relates to a technique that is to be employed for obtaining remaining samples that are to be subsequently analysed for obtaining the audit evidence, from among the entire population of financial and non-financial records associated with the given use case. In one case, the remaining samples include the entire population of such financial and non-financial records. In another case, the remaining samples include only a given portion (namely, only a few records) of the entire population of such financial and non-financial records. Notably, the statistical sampling technique is to be employed upon identification of the key items at (e). Examples of the statistical sampling technique to be employed include, but are not limited to, monetary unit sampling, attribute sampling, stratified sampling, variable sampling. Furthermore, throughout the present disclosure, the "the time period for which audit evidence is to be obtained" relates to a period of time between an audit start date and an audit end date, that defines a period for which the audit evidence is to be obtained. In one case, the server arrangement is configured to automatically select the time period for which the audit evidence is to be obtained. In such a case, the automatic selection could be a random selection, a default selection, or a selection by way of at least one artificial intelligence algorithm. In another case, the server arrangement is configured to enable the user to select the time period for which the audit evidence is to be obtained by providing an input area at the interactive user interface. As an example, the time period for which the audit evidence is to be obtained can be of one year (for example, such as one audit period) for example, such as from January 2016 to December 2016. In such an example, the system obtains the audit evidence for one audit period based upon the input data for the past two years (for example, such as an input data for 24 months from January 2014 to December 2015). In such a case, the input area comprises at least one of: a user-selectable icon, a user-selectable button, an input field, a slider, a dropdown menu. Moreover, throughout the present disclosure, the "level of data aggregation" relates to a given level of data aggregation in which the input data is structured and expressed in a summary form, for purposes such as statistical analysis. For example, the level of data aggregation may be daily basis, weekly basis, monthly basis, quarterly basis, half yearly basis or yearly basis. In an example, the server arrangement is configured to provide a predefined level of data aggregation for example, such as monthly basis.

Optionally, the assurance level to be achieved is expressed as a percentage of assurance. In an embodiment, the assurance level to be achieved ranges from 0 percent assurance to 100 percent assurance. In such a case, the assurance level to be achieved could be, for example, 5, 10, 15, 20, 25, 30, 35, 40, 45, 50, 55, 60, 65, 70, 75, 80, 85, 90, 95 or 100 percent assurance. In another embodiment, the assurance level to be achieved ranges from 50 percent to 100 percent assurance. In such a case, the assurance level to be achieved could be, for example, 50, 55, 60, 65, 70, 75, 80, 85, 90, 95 or 100 percent assurance.

Optionally, the plurality of audit parameters further comprises a combined risk assessment for the given use case, the combined risk assessment comprising at least two of: an inherent risk associated with the given use case, a control risk associated with the given use case, a detection risk associated with the given use case.

Optionally, the server arrangement is configured to enable, via the interactive user interface, the user to input the plurality of audit parameters on "overview" screen of the analyser. More optionally, at the interactive user interface, the time period for which audit evidence is to be obtained is depicted as "audit period" on "overview" screen of the analyser. More optionally, at the interactive user interface, the server arrangement is configured to provide an option for the user to select an account to be audited.

Optionally, the plurality of audit parameters further comprises the response variable and the at least one explanatory variable.

At step (d), the automated or semi-automated system is used to generate the time series chart to be presented to the user via the interactive user interface and identify the upper acceptance bound and the lower acceptance bound of data points in the time series chart. The aforesaid generation of the time series chart can be understood to pertain to a time series evaluation operation that is associated with obtaining the audit evidence and the time series chart can be understood to pertain to time series evaluation information.

The time series chart represents the variation in the response variable with respect to the time. The time series chart is generated for the plurality of samples. In other words, the "time series chart" relates to a graphical representation of a variation of the response variable with respect to time. Furthermore, the time series chart depicts a plurality of data points, wherein each data point corresponds to data values of the response variable for a given sample for a given time period. Therefore, a number of the data points depicted in the time series chart is equal to a number of the plurality of samples associated with the given use case. In other words, the time series chart can be understood to depict the plurality of samples associated with the given use case with respect to the time period for which audit evidence is to be obtained.

Notably, a prediction of the response variable is a function of the at least one explanatory variable. Furthermore, the response variable and the at least one explanatory variable belong to the set of variables. It will be appreciated that the terms "response variable" and "explanatory variable" may also be referred to as an "output variable" and "input variable" respectively.

Optionally, the time series chart is an X/Y scatter plot wherein a given response variable is depicted along the Y axis and time is depicted along the X axis. In such a case, each data point depicted in the X/Y scatter plot can be depicted as a coordinate point having coordinates (x, y) wherein 'x' is a given time span (for example, such as a day, a month, a year, and the like) and 'y' is a given data value of the response variable for the given time span 'x'.

Optionally, data points corresponding to the data values of the response variable that belong to the audit period and data points corresponding to the data values of the response variable that do not belong to the audit period have different colours, different shapes, and/or different sizes.

Optionally, the server arrangement is configured to represent, via the interactive user interface, the variation of the response variable with respect to time. More optionally, at the interactive user interface, the variation of the response variable is represented as a scatter plot on "time series evaluation" screen of the analyser.

Optionally, the server arrangement is configured to represent, via the interactive user interface, the variation of the response variable with respect to time. More optionally, at the interactive user interface, the variation of the response variable is represented as a bar chart on "overview" screen of the analyser.

Moreover, the terms "upper acceptance bound" and "lower acceptance bound" relate to a maximum acceptable limit and a minimum acceptable limit of permissible misstatements within the plurality of samples respectively, that are acceptable while obtaining the audit evidence. Generally, when the input data associated with the given use case is employed for obtaining the audit evidence, a certain degree of error (namely stochastic error, for example) is potentially associated with the obtained audit evidence, and such error may is potentially propagated in subsequent audit procedures that are to be conducted based upon the obtained audit evidence. Therefore, the upper acceptance bound and the lower acceptance bound are employed in order to accommodate for such possible errors. Specifically, the upper acceptance bound and the lower acceptance bound define an acceptance range (or an acceptance interval) therebetween, wherein samples that fall within (namely, lie within) the acceptance range, are considered acceptable for obtaining the audit evidence (namely, samples having none or an acceptable degree of error).

Furthermore, the upper acceptance bound and the lower acceptance bound are identified based upon the plurality of audit parameters and the at least one explanatory variable. Notably, the upper acceptance bound and the lower acceptance bound are a function of the prediction of the response variable (and therefore, a function of the at least one explanatory variable). In an example, the upper acceptance bound and the lower acceptance bound are identified based upon the tolerable error and the at least one explanatory variable. In such an example, the greater the tolerable error, the greater is the acceptance range defined between the upper acceptance bound and the lower acceptance bound. In such an example, a magnitude of the upper acceptance bound and a magnitude of the lower acceptance bound are determined by way of the at least one explanatory variable. In another example, the upper acceptance bound and the lower acceptance bound are identified based upon the assurance level to be achieved and the at least one explanatory variable. In such an example, the greater the assurance level to be achieved the smaller is the acceptance range defined between the upper acceptance bound and the lower acceptance bound. In such an example, a magnitude of the upper acceptance bound and a magnitude of the lower acceptance bound are determined by way of the at least one explanatory variable.

Optionally, in the automated or semi-automated system that, when in operation, provides for time series planning, evaluation and prediction, the server arrangement is configured to calculate the upper acceptance bound and the lower acceptance bound by employing at least one of: a mathematical formula, an artificial intelligence (AI) algorithm or machine learning algorithm (for example, based on k-space deep learning or supervised learning). In such an example, the mathematical formula and the artificial intelligence (AI) algorithm are functions of the plurality of audit parameters and the at least one explanatory variable.

As an example, the following mathematical formula are employed to calculate the upper acceptance bound and the lower acceptance bound:

$$\text{Upper acceptance bound}=\varphi(X)+\gamma+k(\alpha)$$

$$\text{Lower acceptance bound}=\varphi(X)-\gamma+k(\alpha)$$

wherein '$\varphi(X)$' denotes an audit value of the response variable based on the at least one explanatory variable 'X', '$\gamma$' denotes a maximum possible deviation from a book value (namely, a maximum tolerable error), and '$k(\alpha)$' denotes a function of uncertainty a of the audit value $\varphi(X)$.

Optionally, in the automated or semi-automated system that provides time series planning, evaluation and prediction, the server arrangement is configured to present, at the interactive user interface, a calculation of the upper acceptance bound and the lower acceptance bound. Optionally, in this regard, at the interactive user interface, the aforesaid calculation of the upper and lower acceptance bounds is represented in a form of alphanumeric text or an image. The aforesaid calculation of the upper acceptance bound and the lower acceptance bound can be understood to pertain to the time series evaluation operation that is associated with obtaining the audit evidence and the calculated upper acceptance bound and lower acceptance bound can be understood to pertain to the time series evaluation information.

Optionally, in the automated or semi-automated system, the server arrangement is configured to generate a plurality of time series charts to be presented to the user of the interactive user interface, wherein different time series charts represent a variation of the response variable with respect to time, for different explanatory variables.

Optionally, in the automated or semi-automated system, the server arrangement is configured to provide a variable input area at the interactive user interface, the variable input area enabling the user to input the response variable and the time period for which audit evidence is to be obtained (namely, an audit start date and an audit end date), that are to be employed for generating the time series chart, wherein the response variable belong to the set of variables. Optionally, the variable input area comprises at least one of: a user-selectable icon, a user selectable button, an input field, a slider, a dropdown menu.

Optionally, the variable input area further enables the user to input the at least one explanatory variable that is to be employed for determining the upper acceptance bound and the lower acceptance bound.

Optionally, in the automated or semi-automated system, the server arrangement is configured to enable, via the interactive user interface, the user to select the at least one explanatory variable. More optionally, the server arrangement is configured to present, at the interactive user interface, suggestions to the user for the at least one explanatory variable from amongst the set of variables. Optionally, in this regard, at the interactive user interface, the provided suggestions are represented in a form of: a table, text, or a list. In such an example, the provided suggestions can be generated by way of at least one artificial algorithm for example, such as "lasso". Furthermore, the provided suggestions can be understood to pertain to the time series evaluation information.

Optionally, the provided suggestions are represented in a form of a table. Notably, in such an example, the variables of the set are arranged in an increasing or decreasing order of an influence of the at least one explanatory variable on the prediction of the variation in the response variable. Furthermore, in such an example, the provided suggestions are depicted as a "suggestion table". Additionally, in such an example, the variables of the set are arranged in an increasing or decreasing order of a correlation of the at least one explanatory variable with the response variable. Furthermore, in such an example, the provided suggestions are depicted as a "correlation table". Optionally, the "suggestion table" and the "correlation table" are depicted on the "time series evaluation" screen of the analyser.

Optionally, the selection of the at least one explanatory variable, via such provided suggestions, allows the user to select a best possible variable from the set as the at least on explanatory variable for providing an optimized value for the magnitude of the upper acceptance bound and the magnitude of the lower acceptance bound, a minimum number of key items that are required to be tested, and/or a minimum number of the remaining samples associated with the given use example that is to be subsequently analysed.

At step (e), the automated or semi-automated system is used to identify, from amongst the plurality of samples, key items that are required to be tested, the key items being samples that fall outside the upper acceptance bound and the lower acceptance bound in the time series chart. Notably, the term "key items" relates to samples (and specifically, data points corresponding to the samples) depicted in the time series chart that lie outside the acceptance range defined between the upper acceptance bound and the lower acceptance bound. It will be appreciated that such key items are considered to have substantial misstatement associated therewith, and are susceptible to being considered to be inacceptable audit evidence by the user.

Optionally, whilst identifying the key items that are required to be tested at step (e), the method comprises using the automated or semi-automated system to depict distinctly the key items that are required to be tested and samples that fall within the upper acceptance bound and the lower acceptance bound in the time series chart. Optionally, in this regard, the automated or semi-automated system employs colour-coding in a manner that a first colour is used to depict the key items that are required to be tested and a second colour is used to depict the samples that fall within the upper acceptance bound and the lower acceptance bound in the time series chart, the first colour being different from the second colour. It will be appreciated that such colour coding allows for the user to distinguish easily and correctly between the key items that are required to be tested, and the samples that need not be tested. As an example, a red colour is used to depict the key items that are required to be tested and a yellow colour is used to depict the samples that fall within the upper acceptance bound and the lower acceptance bound in the time series chart.

Optionally, in the automated or semi-automated system, the server arrangement is configured to present, at the interactive user interface, a calculation of the key items that are required to be tested, based upon the upper acceptance bound and the lower acceptance bound. Optionally, in this regard, at the interactive user interface, the aforesaid calculation of the key items is represented in form of alphanumeric text or an image. Furthermore, the calculated key items that are required to be tested can be understood to pertain to the time series evaluation information.

Optionally, in the automated or semi-automated system, the server arrangement is configured to present, at the interactive user interface, a number of the key items that are required to be tested. In such an example, the number of the key items that are required to be tested can be considered to be an output presented to the user by the automated or semi-automated system.

Optionally, in the automated or semi-automated system, the server arrangement is configured to calculate the number of the remaining samples associated with the given use case that are to be subsequently analysed for obtaining the audit evidence, based upon at least one of:

(i) the plurality of audit parameters, and (ii) the identified key items at step (e).

It will be appreciated that lesser the total amount of key items of identified key items at step (e), the lesser the number of misstatements and inaccuracies in the obtained audit evidence, the greater is the reliability of the obtained audit evidence associated with the plurality of samples, and the smaller is the remaining sample size to be subsequently analysed for obtaining the audit evidence. The aforesaid calculation of the number of remaining samples associated with a given use case that are to be analysed can be understood to pertain to the time series evaluation operation that is associated with obtaining the audit evidence. Furthermore, such a calculation of the number of remaining samples associated with the given use case that are to be analysed, can be understood to pertain to the time series evaluation information. Optionally, the aforesaid number of remaining samples that are to be analysed, is presented to the user, via the interactive user interface. In such an example, the number of remaining samples (within the entire population of financial and non-financial records associated with the given use case) can be considered to be an output presented to the user by the automated or semi-automated system.

Optionally, in the automated or semi-automated system, the server arrangement is configured to:

enable, via the interactive user interface, the user to adjust at least one audit parameter from among the plurality of audit parameters; and iteratively perform (d) and (e) for the adjusted at least one audit parameter.

It will be appreciated that such a manner of using the automated or semi-automated system allows the user to find a combination of audit parameters and key items that are suitable (namely, appropriate) according to his/her audit strategy. Notably, the user is able to adjust the assurance level to be obtained and/or the tolerable error until he/she is satisfied with a quality of the obtained audit evidence for the specified time period. When the user adjusts the assurance level and/or the tolerable error for the audit evidence, the upper acceptance bound and the lower acceptance bound which are based upon such audit parameters, also change. As a result, the generated time series chart to be presented to the user also changes, leading to a subsequent change in key items that are required to be tested. Furthermore, optionally, the aforesaid adjustment of the assurance level to be achieved and/or the tolerable error allows for the user to find a suitable number of the remaining samples to be analysed.

Optionally, when the user increases the assurance level to be obtained, upon iteratively performing the steps (d) and (e) for the adjusted assurance level, the upper acceptance bound and the lower acceptance bound are changed in a manner that the acceptance range defined between the upper acceptance bound and the lower acceptance bound decreases. As a result, a number of the key items that are required to be tested increases. Conversely, when the user decreases the assurance level to be obtained, upon iteratively performing the steps (d) and (e) for the adjusted assurance level, the upper acceptance bound and the lower acceptance bound are changed in a manner that the acceptance range defined between the upper acceptance bound and the lower acceptance bound increases. As a result, the number of the key items that are required to be tested decreases. Therefore, it will be appreciated that there may exist:

(i) an inverse relationship between the assurance level to be obtained and the acceptance range; and (ii) a direct relationship between the assurance level and the number of the key items that are required to be tested.

Optionally, when the user increases the tolerable error, upon iteratively performing the steps (d) and (e) for the adjusted tolerable error, the upper acceptance bound and the lower acceptance bound are changed in a manner that the acceptance range defined between the upper acceptance bound and the lower acceptance bound increases. As a result, the number of the key items that are required to be tested decreases. Conversely, when the user decreases the tolerable error, upon iteratively performing the steps (d) and (e) for the adjusted tolerable error, the upper acceptance bound and the lower acceptance bound are changed in a manner that the acceptance range defined between the upper acceptance bound and the lower acceptance bound decreases. As a result, the number of the key items that are required to be tested increases. Therefore, it will be appreciated that there may exist:

(i) a direct relationship between the tolerable error and the acceptance range; and (ii) an indirect relationship between the tolerable error and the number of the key items that are required to be tested.

Optionally, when the user increases both the assurance level to be obtained and the tolerable error, upon iteratively performing the steps (d) and (e) for the adjusted assurance level and the tolerable error, the upper acceptance bound and the lower acceptance bound are changed according to a mathematical function. Optionally, in this regard, the mathematical function is to be employed for determining the upper acceptance bound and the lower acceptance bound, based upon weights assigned to the assurance level to be obtained and the tolerable error in the mathematical function.

Optionally, the user adjusts the assurance level to be achieved and/or the tolerable error for the audit evidence by way of the input area (that is provided at the interactive user interface for enabling the user to input the plurality of audit parameters).

Optionally, the user adjusts the assurance level to be achieved and/or the tolerable error, based upon data values of the response variable and the at least one explanatory variable.

Optionally, in the automated or semi-automated system, the server arrangement is configured to provide an optimisation option in the interactive user interface that, when selected by the user, optimises the plurality of audit parameters in a manner that an expected audit effort is minimized. Notably, the optimisation option in the interactive user interface that, when selected by the user, optimises the assurance level in a manner that the expected audit effort is minimized. Furthermore, the expected audit effort is minimized when an optimal balance is found between the number of key items to be tested and the sample size to be subsequently analysed. Furthermore, the optimisation option finds an optimal combination of the plurality of audit parameters that allows for generating an optimal time series chart having a minimum number of the total items, thereby minimizing the expected audit effort. Optionally, the optimisation option also allows for generating the non-linear time series chart. It will be appreciated that such an optimisation option facilitates the user to conveniently obtain a satisfactory quality of audit evidence. Optionally, upon selection of the optimisation option by the user, the automated or semi-automated time series planning, evaluation and prediction system implements the steps (d) and (e) for multiple combinations of the plurality of audit parameters to identify different key items corresponding to each combination of the plurality of different audit parameters. Therefore, a combination of the plurality of audit parameters associated with an optimized number of key items is selected in a manner that the optimal balance is found between the number of key items to be tested and the sample size to be subsequently analysed. Optionally, the optimisation option is provided by way of at least one of: a user-selectable icon, a user selectable button, a dropdown menu.

Optionally, in the automated or semi-automated system, the server arrangement is configured to determine relationships existing between the variables of the set. It will be appreciated that there exist several relationships between the variables of the set, and often, such relationships are not perceivable and/or quantifiable by merely viewing the validated input data. Such relationships existing between the variables of the set are beneficially subsequently evaluated and analysed by the user to obtain the audit evidence. Notably, such a determination of the relationships existing between the variables of the set pertains to the time series planning operation associated with obtaining the audit evidence. Furthermore, the response variable and the at least one explanatory variable are optionally based upon the determined relationships existing between the variables of the set. Optionally, in this regard, the response variable and the at least one explanatory variable have a high degree of relationship (namely, a strong relationship) therebetween.

Optionally, for stochastic noise reduction purposes, in the automated or semi-automated system, the server arrangement is configured to calculate correlation coefficients between the variables of the set, to determine the relationships existing therebetween. In such an example, the calculated value of a given correlation coefficient between two given variables of the set ranges from −1 to +1. Notably, the greater an absolute value of the given correlation coefficient, the greater is a degree (namely, magnitude) of relationship between the two given variables. Furthermore, a positive correlation coefficient indicates a direct relationship between the two given variables whereas a negative correlation coefficient indicates an inverse relationship between the two given variables. Notably, such a calculation of correlation coefficients pertains to the time series planning operation associated with obtaining the audit evidence. Furthermore, the calculated correlation coefficients can be understood to pertain to the time series planning information.

As an example, for the aforesaid given use case 'UC' having the set of eight variables V1-V8 pertaining thereto, a correlation coefficient between the variables V2 (sales) and V3 (selling area) are calculated to be equal to +0.3, whereas correlation coefficient between the variables V2 (sales) and V8 (number of customers) are calculated to be equal to +0.7. Therefore, whilst the variable V2 is directly related to both the variables V3 and V8, the variable V2 has a higher degree of relationship (namely, a stronger relationship) with the variable V8 as compared to the variable V3.

Optionally, in the automated or semi-automated system, the server arrangement is configured to:

enable, via the interactive user interface, the user to select a variable of interest from the set of variables;

determine an impact of remaining variables of the set on the variable of interest, based upon the relationships existing between the variables;

represent, via the interactive user interface, the impact of the remaining variables on the variable of interest; and represent, via the interactive user interface, inter-relations that exist between the remaining variables.

In such a case, the "variable of interest" can be any given variable among the set of variables, whose relationship with other remaining variables of the set is to be analysed by the user. Notably, a given remaining variable is said to have a high impact on the variable of interest if there is a strong relationship between the given remaining variable and the variable of interest. Optionally, the impact of remaining variables of the set on the variable of interest is directly proportional to the calculated correlation coefficients between the variable of interest and the remaining variables of the set. As an example, in the aforesaid example describing the given use case 'UC' having the set of eight variables V1-V8 pertaining thereto, the calculated correlation coefficient between the variables V1 (sales) and V3 (selling area) is equal to +0.3, whereas the calculated correlation coefficient between the variables V1 and V8 (number of customers) is equal to +0.7. In such an example, the variable V1 can be considered to be the variable of interest and the variables V3 and V8 can be considered as the remaining variables of the set of eight variables V1-V8. Therefore, in such a case, an impact of the variable V3 on the variable V1 is potentially less than an impact of the variable V8 on the variable V1.

Optionally, the user selects the variable of interest from the set of variables via a variable of interest selector, the variable of interest selector being implemented by at least one of: a user-selectable icon, a user selectable button, an input field, a slider, a dropdown menu. Furthermore, the selected variable of interest can be understood to pertain to the time series planning information.

Optionally, at the interactive user interface, the impact of the remaining variables on the variable of interest is represented by way of a solar correlation representation, the solar correlation representation depicting the variable of interest to be arranged at a centre of the solar correlation representation, and a plurality of concentric orbits around the variable of interest, wherein each of the plurality of concentric orbits represents a distinct correlation coefficient, and wherein a given remaining variable is arranged in an orbit based upon a given correlation coefficient between the given remaining variable and the variable of interest. In such an example, the plurality of concentric orbits generally represents absolute values of correlation coefficients. It will be appreciated that in such a case, a specific remaining variable can be arranged in only one orbit, whereas a given orbit representing a given correlation coefficient is used to depict zero, single, or multiple remaining variables therein. Notably, the given orbit is capable of depicting only those remaining variables therein that are associated with the variable of interest according to the given correlation coefficient. Furthermore, the aforesaid representation of the impact of the remaining variables on the variable of interest by way of the solar correlation representation pertains to the time series planning operation associated with obtaining the audit evidence. Moreover, the solar correlation representation can be understood to pertain to the time series planning information.

Optionally, the plurality of concentric orbits is arranged around the variable of interest in a manner that a distance of a given orbit from the variable of interest is inversely proportional to its corresponding correlation coefficient. In other words, a first orbit representing a first correlation coefficient is arranged farther away from the variable of interest as compared to a second orbit representing a second correlation coefficient, if the first correlation coefficient is smaller than the second correlation coefficient.

In an embodiment, eleven concentric orbits are arranged around the variable of interest, wherein the eleven concentric orbits represent 1, 0.9, 0.8, 0.7, 0.6, 0.5, 0.4, 0.3, 0.2, 0.1 and 0 correlation coefficients. In another embodiment, ten concentric orbits are arranged around the variable of interest, wherein the ten concentric orbits represent 0.9, 0.8, 0.7, 0.6, 0.5, 0.4, 0.3, 0.2, 0.1 and 0 correlation coefficients. In yet another embodiment, five concentric orbits are arranged around the variable of interest, wherein the five concentric orbits represent 0.8, 0.6, 0.4, 0.2 and 0 correlation coefficients.

As an example, in the aforesaid example describing the given use case 'UC' having the set of eight variables V1-V8 pertaining thereto, the variable V1 are the variable of interest and the variables V2, V3, V4, V5, V6, V7 and V8 are the remaining variables of the set of eight variables V1-V8 having correlation coefficients 0, 0.3, 0.9, 0.5, 0.9, 0.9 and 0.7 respectively, with respect to the variable of interest V1. In such an example, a solar correlation representation 'SOL' pertaining to the given use case 'UC' represents the variable V1 arranged at a centre of the solar correlation representation 'SOL', and ten concentric orbits arranged around the variable V1. Therefore, the variable V1 is arranged in an orbit representing 0 correlation coefficient, the variable V3 is arranged in an orbit representing 0.3 correlation coefficient, the variable V5 is arranged in an orbit representing 0.5 correlation coefficient, the variable V8 is arranged in an orbit representing 0.7 correlation coefficient, and the variables V4, V6 and V7 are arranged in an orbit representing 0.9 correlation coefficient. It will be appreciated that in such an example, the orbits representing 0.1, 0.2, 0.4, 0.6 and 0.8 correlation coefficients, are empty.

Optionally, a selection of the response variable, and the at least one explanatory variable, is based upon the impact of the remaining variables on the variable of interest, wherein the response variable is the variable of interest and the at least one explanatory variable is selected from amongst the remaining variables of the set. As an example, the user selects a given variable of interest as the response variable and at least one given remaining variable from amongst the remaining variables of the set, wherein the at least one given remaining variable is arranged in concentric orbit(s) arranged close to the variable of interest, for generating the time series chart.

Optionally, at the interactive user interface, the impact of the remaining variables on the variable of interest is represented as a solar correlation map on "time series planning" screen of the analyser.

Optionally, at the interactive user interface, the inter-relations that exist between the remaining variables is represented by way of the solar correlation representation. Notably, an arrangement of the remaining variables in the solar correlation representation represents the inter-relations that exist between such remaining variables.

Optionally, in the solar correlation representation, an arrangement of the remaining variables about the variable of interest represents the inter-relations that exist between the remaining variables. Notably, variables lying on opposite sides of the variable of interest are potentially not inter-related whereas variables lying on the same side of the variable of interest are potentially inter-related. It will be appreciated that such a manner of representing the inter-relations that exist between the remaining variables is not limited to representing inter-relations of variables lying on a same orbit only, but can also be employed for representing inter-relations of variables lying on separate orbits.

Optionally, for a plurality of remaining variables that are arranged on a same orbit of the solar correlation representation, a distance (namely, a separation) between the plurality of remaining variables is directly proportional to a degree (namely, a strength) of inter-relations that exist therebetween. As an example, three variables X1, X2 and X3 are arranged on a single orbit, wherein the variables X1 and X3 are arranged close to each other, and substantially away from the variable X2. In such an example:

(i) the variables X1 and X3 have a strong inter-relation there between, (ii) the variables X1 and X2 have a weak inter-relation there between, and (iii) the variables X3 and X2 have a weak inter-relation there between.

Optionally, the server arrangement is configured to enable, via the interactive user interface, the user to select a first variable and at least one second variable from the set of variables. More optionally, the user selects the first variable and the at least one second variable from the set of variables via the first variable selector and the at least one second variable selector, respectively. Furthermore, the first variable selector and the at least one second variable selector being implemented by at least one of: a user-selectable icon, a user selectable button, an input field, a slider, a dropdown menu.

Moreover, the first variable and the at least one second variable can be understood to pertain to the time series planning information. As an example, the user may select the first variable as the response variable and the at least one second variable as at least one explanatory variable.

Optionally, the server arrangement is configured to represent, via the interactive user interface, a relationship between the first variable and the at least one second variable. Furthermore, at the interactive user interface, relationship between the first variable and the at least one second variable is represented as a scatter plot on "time series planning" screen of the analyser.

Optionally, in the automated or semi-automated time series planning, evaluation and prediction system, the at least one explanatory variable is at least one of: a variable from the set of variables, an external variable, a time-dependent variable. Notably, the variable from the set of variables can also be referred to as an internal variable of the use case. The term, "external variable" relates to a given variable other than the variable from the set of variables. Such an external variable is not provided by the user as the audit evidence. In an example, the external variable are a monthly production index of durable goods manufactured by various manufacturers in a given country. In such an example, the monthly production index of durable goods can be employed to determine revenue of a single manufacturer of the given country. Furthermore, in such an example, such external variables can be referred to as economic indicators. Moreover, such economic indicators can be obtained for various industrial sectors in the given country. Examples of such an external variable include, but are not limited to, rental of the user property, number of employees and/or customers associated with the user. Moreover, the term "time-dependent variable" relates to a given variable that changes with respect to time. Notably, the time-dependent variables relate to trends and/or yearly patterns with respect to which the variable changes. In an example, a time-dependent variable "Dec" may have a data value "1" for December and a data value "0" for all other months. In another example, a time-dependent variable "Trend" has a data value "1" for January, a data value "2" for February, a data value "3" for March and so on. In such an example, the data values of the time-dependent variable "Trend" are arranged in increasing order of time. Optionally, the time-dependent variables can be used as the external and internal variables to explain the response variable.

Optionally, for prediction of the response variable with respect to the at least one explanatory variable, the server arrangement can employ time-dependent variable, external variable or any combination thereof.

Optionally, the server arrangement enables, via the interactive user interface, the user to select the at least one explanatory variable from at least one of: the variable from the set of variables, the external variable, the time-dependent variables. Optionally, in this regard, the at least one explanatory variable is selected by way of at least one of: a user-selectable icon, a user-selectable button, an input field, a slider, a dropdown menu.

Optionally, in the automated or semi-automated system, the server arrangement is configured to:

prepare a curated set of variables, wherein each variable of the curated set has a corresponding relationship with the response variable; and provide, via the interactive user interface, a recommended set of variables, wherein variables of the recommended set are selected from amongst the curated set of variables according to an importance of relationships existing between the variables of the curated set and the response variable.

The term "curated set of variables" relates to a given set of variables that include an internal variable, an external variable and/or a time-dependent variable, wherein the internal variable, the external variable and the time-dependent variable have a relationship existing with the response variable. Notably, the internal variable, the external variable and the time-dependent variable relates to the variables amongst the set of variables having correlation with the response variable.

Optionally, a number of variables in the recommended set is the same as a number of variables in the curated set. Alternatively, optionally, a number of variables in the recommended set is less than a number of variables in the curated set.

Optionally, the variables of the recommended set are provided in an ascendant manner of calculated correlation coefficients between the variables of the recommended set and the response variable. For example, the curated set may have variables V1-V8, but recommended set may list variables in an ascendant order, for example such as, V2, V5, V1, V7, V8, V3, V4 and V6. In such an example, highest calculated correlation coefficient can be between variable V6 and a given response variable Z, and lowest calculated correlation coefficient can be between variable V2 and the given response variable Z, and so on.

Alternatively, optionally, the variables of the recommended set are provided in an unordered manner. For example, the curated set has 15 variables whereas the recommended set has only 8 unordered variables.

Optionally, in the automated or semi-automated system, the server arrangement is configured to enable, via the interactive user interface, the user to select, from amongst the recommended set of variables, the at least one explanatory variable.

Optionally, in the automated or semi-automated system, the server arrangement is configured to:

obtain forecast data for variation in data values of a given variable over a given future time period, the given variable being one variable among the set of variables;

generate a forecast time series chart to be presented to the user via the interactive user interface and identify an expected upper acceptance bound and an expected lower acceptance bound of data points in the forecast time series chart, the forecast time series chart representing a variation in the given variable with respect to time by way of a plurality of prior, current and forecasted data values of the given variable, wherein the expected upper acceptance bound and the expected lower acceptance bound are to be identified based upon the plurality of audit parameters and at least one forecasting variable, the at least one forecasting variable is at least one of: an external variable, a time-dependent variable; and identify unexpected data values from amongst the plurality of forecasted data values of the given variable, the unexpected data values being data points that fall outside the expected upper acceptance bound and the expected lower acceptance bound in the forecast time series chart.

The term "forecast data" relates to predicted (namely, estimated) data values of a given variable over a given future time period. Notably, the forecast data is predicted based upon existing trends and/or yearly pattern with respect to which the given variable is varying over time. In an example, the server arrangement directly obtains the forecast data for variation in data values of a given variable over a given future time period pertaining to the given use case. In such an example, the user manually inputs (namely, enters) the forecast data into the server arrangement.

As an example, a given use case may relate to financial and accounting items for a given company. In such an example, the forecast data relates to a set of variable F1 associated with financial and accounting items for the given company. Furthermore, in such an example, the variable F1 includes forecast data related to total revenues of the given company over the given future time period.

Optionally, the forecast time series chart represents the variation of the given variable with respect to time by way of the plurality of prior, current and forecasted data values of the given variable. Notably, a prediction of the given variable is a function of the at least one forecasting variable. Furthermore, the forecast time series chart depicts a plurality of data points, wherein each data point corresponds to data values of the given variable with respect to time, for a given sample. Therefore, a number of the data points depicted in the forecast time series chart is equal to a number of the plurality of samples associated with the given use example. Notably, the forecasted data values of the given variable are predicted based upon the plurality of prior and current data values of the given variable. As an example, a given future time period for which the forecast data is to be obtained can be of one year for example, such as from January 2019 to December 2019. In such an example, the system predicts the plurality of forecasted data values for the given future period based upon the plurality of prior and current data values for two years (for example, such as data values for 24 months from January 2017 to December 2018).

Optionally, the forecast time series chart is an X/Y scatter plot wherein values of a given variable is depicted along the Y axis and a given time period is depicted along the X axis. In such an example, each data point depicted in the X/Y scatter plot can be depicted as a coordinate point having coordinates (x, y) wherein 'x' is the given time period and 'y' is a given data value of the given variable varying over time. Notably, in the forecast time series chart, the plurality of prior and current data values are depicted as light circles whereas the plurality of forecasted data values are depicted as darkened circles. The prior and current data values are separated from the forecasted data values by way of a vertical line.

Optionally, data points corresponding to the plurality of prior and current data values of the given variable that belong to the current audit period as well as past periods and data points corresponding to the plurality of forecasted data values of the given variable that belongs to the future time period have different colours, different shapes, and/or different sizes.

Optionally, the server arrangement is configured to represent, via the interactive user interface, the variation of the given variable with respect to time. More optionally, at the interactive user interface, the variation of the given variable is represented as a scatter plot on "forecast" screen of the analyser.

Optionally, the expected upper acceptance bound and the expected lower acceptance bound are identified based upon the plurality of audit parameters and the at least one forecasting variable. Notably, the expected upper acceptance bound and the expected lower acceptance bound are a function of the prediction of the given variable (and therefore, a function of the at least one forecasting variable).

Optionally, in the automated or semi-automated system, the server arrangement is configured to calculate the expected upper acceptance bound and the expected lower acceptance bound by employing at least one of: a mathematical formula, an artificial intelligence algorithm. In such an example, the mathematical formula and the artificial intelligence algorithm are functions of the plurality of audit parameters and the at least one forecasting variable.

As an example, the following mathematical formula is employed to calculate the expected upper acceptance bound and the expected lower acceptance bound:

$$\text{Expected upper acceptance bound} = \varphi(X) + \gamma + k(\alpha)$$

$$\text{Expected lower acceptance bound} = \varphi(X) - \gamma + k(\alpha)$$

wherein '$\varphi(X)$' denotes a forecasted value of the given variable based on the at least one forecasting variable 'X', '$\gamma$' denotes a maximum possible deviation from a book value (namely, a maximum tolerable error), and '$k(\alpha)$' denotes a function of uncertainty a of the forecasted value $\varphi(X)$.

Optionally, the at least one forecasting variable is at least one of: an external variable, a time-dependent variable. Notably, the time-dependent variable and/or the external variable, for which the data values of the given variable can be predicted, relates to the at least one forecasting variable. Furthermore, the influence of the at least one user selected external and/or time-dependent variable on the estimation of the given variable is represented at the interactive user interface.

Optionally, in the automated or semi-automated system, the server arrangement is configured to enable, via the interactive user interface, the user to select the at least one forecasting variable from amongst the set of external variables and/or time-dependent variables. More optionally, the server arrangement is configured to present, at the interactive user interface, suggestions to the user for the at least one forecasting variable from amongst the set of external variables and/or time-dependent variables. Optionally, in this regard, at the interactive user interface, the provided suggestions are represented in a form of: a table, text, or a list. In such a case, the provided suggestions can be generated by way of at least one artificial intelligence algorithm. Optionally, the provided suggestions are to be selected via at least one of: a user-selectable icon, a user selectable button, a slider, a dropdown menu. More optionally, the provided suggestions are depicted on the "forecast" screen of the analyser.

Alternatively, optionally, in the automated or semi-automated system, the server arrangement is configured to automatically select the at least one forecasting variable from amongst the set of external variables and/or time-dependent variables. In such an example, an average value of the response variable is automatically selected as a value of the at least one forecasting variable for prediction. Furthermore, in such an example, the automatic selection of the average value of the response variable done by a way of at least one artificial intelligence algorithm.

Notably, the term "unexpected data values" relates to samples (and specifically, data points corresponding to the samples) depicted in the forecast time series chart that lie outside the acceptance range defined between the expected upper acceptance bound and the expected lower acceptance bound.

Optionally, in the automated or semi-automated system, the server arrangement is configured to:

determine an objective prediction for the given variable, the objective prediction comprising predicted data values of the given variable over the given future time period;

determine an average prediction error for the forecast data, based upon the objective prediction; and represent, via the interactive user interface, maximum achievable assurance level for the data values of the given variable over the given future time period, based upon the average prediction error for the forecast data.

Optionally, in the automated or semi-automated system, the server arrangement is configured to calculate the objective prediction by employing at least one of: a mathematical formula, an artificial intelligence algorithm. In one example, the objective prediction is based upon an average value of the given variable. In another example, the objective prediction is based upon the prior relationships existing between the given variable and the at least one forecasting variable.

As an example, the objective prediction for the given variable is calculated by employing a linear regression model. In such an example, data points of prior years and current audit period is used to estimate the linear regression model, thereby extrapolating such a model to forecast the values of the response variable for a predefined future period. The following linear regression function is beneficially employed to calculate the objective prediction:

$$y = \beta_o + \beta_1 x_1 + \ldots + \beta_p x_p$$

wherein 'y' denotes estimation of the response variable, '$x_1$' . . . '$x_p$' denotes forecast variables and '$\beta_o$' . . . $\beta_p$' denotes the regression coefficients.

Optionally, the average prediction error for the forecast data is determined based upon a difference between a prediction determined by the server arrangement for the given variable and the forecasted data.

It will be appreciated that reliability of the obtained forecasted data associated with the given variable is validated.

Optionally, the reliability of the forecasted data is dependent upon:

(i) explanation of the forecasting variable based upon the audited variable, (ii) reliability of the future values of the forecasting variables, and (iii) occurrence of the timely patterns like trends and yearly patterns in the future.

Optionally, the automated or semi-automated system generates a probability distribution of possible absolute future change of the response variable and its associated reliability of the prediction. More optionally, the automated or semi-automated system enables the user to obtain the average prediction error via the interactive user interface.

Optionally, the automated or semi-automated system is configured to calculate the maximum achievable assurance level based upon the average prediction error for the forecast data. Notably, the maximum achievable assurance level relates to a maximum level of confidence that is to be achieved pertaining to accuracy of a total sum of a given variable for the future period. Furthermore, the maximum achievable assurance level can be understood in light of the expected upper acceptance bound and the expected lower acceptance bound. As an example, when a user predicts monthly values for the given variable for the future period, all the predicted values are added to the system. In such an example, the maximum achievable assurance level is determined for the total sum of the given variable for the future period, thereby allowing the system to calculate the expected upper acceptance bound and expected the lower acceptance bound.

Optionally, the maximum achievable assurance level for a total change rate of the given variable over the given future time period is presented by way of a statistical representation such as a bar chart to the user, wherein the maximal achievable assurance level is depicted along the Y-axis and the total change rate of the given variable over the given future time period is depicted along the X-axis. More optionally, at the interactive user interface, the aforementioned bar chart is depicted on "forecast" screen of the analyser.

The present disclosure also relates to the method as described above. Various embodiments and variants disclosed above apply mutatis mutandis to the method.

Optionally, the method further comprises using the system for:

enabling, via the interactive user interface, the user to adjust the at least one audit parameter from among the plurality of audit parameters; and iteratively performing the steps (iv) and (v) for the adjusted at least one audit parameter.

Optionally, the method further comprises using the system to provide the optimisation option in the interactive user interface that, when selected by the user, optimises the plurality of audit parameters in the manner that an expected audit effort is minimized.

Optionally, the method further comprises using the system to determine the relationships existing between the variables of the set.

Optionally, the method further comprises using the system for:

enabling, via the interactive user interface, the user to select the variable of interest from the set of variables;

determining the impact of remaining variables of the set on the variable of interest, based upon the relationships existing between the variables;

representing, via the interactive user interface, the impact of the remaining variables on the variable of interest; and representing, via the interactive user interface, the inter-relations that exist between the remaining variables.

Optionally, in the method, the at least one explanatory variable is at least one of: the variable from the set of variables, the external variable, the time-dependent variable.

Optionally, the method further comprises using the system to represent, via the interactive user interface, the influence of the at least one explanatory variable on estimation of the response variable.

Optionally, the method further comprises using the system for:

obtaining the forecast data for variation in the data values of the given variable over the given future time period, the given variable being one variable among the set of variables;

generating the forecast time series chart to be presented to the user via the interactive user interface and identifying the expected upper acceptance bound and the expected lower acceptance bound of data points in the forecast time series chart, wherein the forecast time series chart represents the variation in the given variable with respect to time by way of the plurality of prior, current and forecasted data values of the given variable, wherein the expected upper acceptance bound and the expected lower acceptance bound are identified based upon the plurality of audit parameters and the at least one forecasting variable, the at least one forecasting variable is at least one of: an external variable, a time-dependent variable; and identifying the unexpected data values from amongst the plurality of forecasted data values of the given variable, the unexpected data values being data points that fall outside the expected upper acceptance bound and the expected lower acceptance bound in the forecast time series chart.

Optionally, the method further comprises using the system for:

determining the objective prediction function for the given variable, the objective prediction comprising predicted data values of the given variable over the given future time period;

determining an average prediction error for the forecast data, based upon the objective prediction; and representing, via the interactive user interface, the maximum achievable assurance level for the data values of the given variable over the given future time period, based upon the average prediction error for the forecast data.

Optionally, in the software product, the program instructions, when accessed by the processing device, cause the processing device to:

enable, via the interactive user interface, the user to adjust the at least one audit parameter from among the plurality of audit parameters; and iteratively perform (d) and (e) for the adjusted at least one audit parameter.

DETAILED DESCRIPTION OF THE DRAWINGS

Figure 1B:
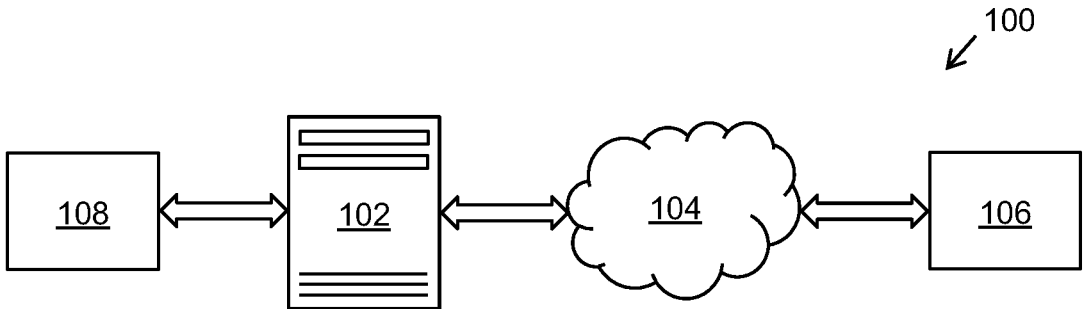

Referring to FIGS. 1A and 1B, illustrated are schematic illustrations of a network environment 100 wherein a system is implemented that, when in operation, performs time series planning, evaluation and prediction, in accordance with different embodiments of the present disclosure. Notably, the network environment 100 includes: a server arrangement 102 including at least one server, a communication network 104, a user device 106 associated with a user of the automated or semi-automated time series planning, evaluation and prediction system, and a source 108 of input data. Furthermore, the server arrangement 102 is coupled in communication with a time series analysis module for performing time series analysis operations. The time series analysis module is implemented by employing a configuration of field-programmable gate arrays (FPGAs) and reduced instruction set (RISC) computers. As shown, in the network environment 100, the server arrangement 102 is coupled in communication with the user device 106 via the communication network 104.

In FIG. 1A, the server arrangement 102 is coupled in communication with the source 108 of the input data via the communication network 104.

In FIG. 1B, the server arrangement 102 is directly coupled in communication with the source 108 of the input data.

Figure 1C:
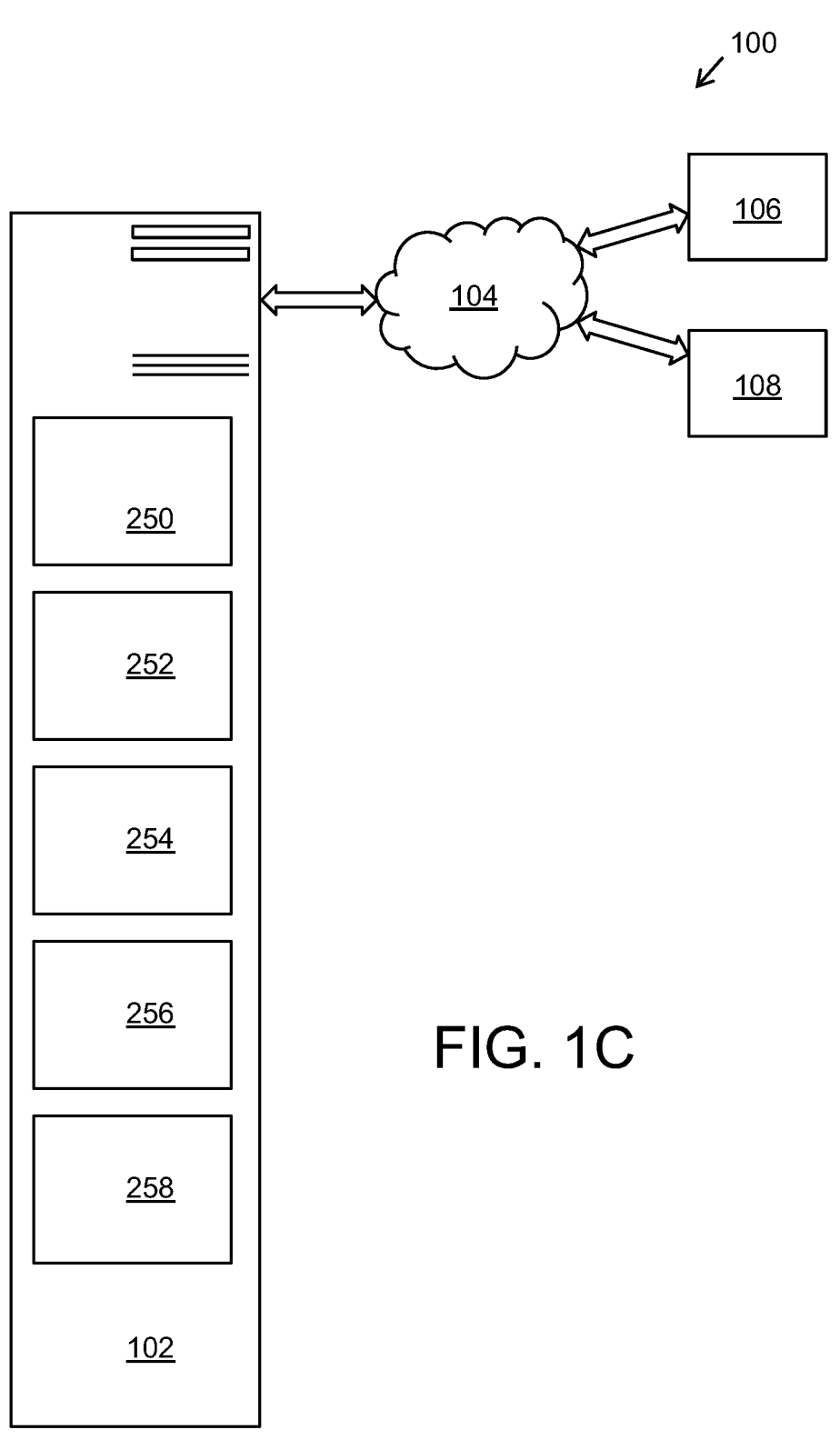
FIG. 1C is a schematic illustration of various modules included within the system of FIGS. 1A and 1B, wherein the modules are implemented in specialist hardware, software, or a combination of specialist hardware and software.

In FIG. 1C, the server arrangement 102 is shown implemented as a configuration of modules. Beneficially, the modules comprise a data input module 250, a validation module 252, an interactive user interface module 254, a data analysis module 256 and an identification module 258. These modules 250 to 258 mutually interact when in operation, and exchange data therebetween. Moreover, the modules 250 to 258 are optionally implemented in custom-designed hardware, in software executable on computing hardware, or a combination of such custom-designed hardware and software. For example, the custom-designed hardware employs FPGA's that have been configured via their gate connections to implement data processing as described in the foregoing. Such a modular design enables the server arrangement 102 to be conveniently reconfigured and updated as more effective algorithms are developed for the system.

It will be appreciated that FIGS. 1A and 1B are merely an example, which should not unduly limit the scope of the claims herein. It is to be understood that the specific designation for the network environment 100 is provided as an example and is not to be construed as limiting the network environment 100 to specific numbers, types, or arrangements of user devices, servers, sources of input data, and communication networks. A person skilled in the art will recognize many variations, alternatives, and modifications of embodiments of the present disclosure.

Referring to FIGS. 2A, 2B, 2C, 2D, 2E and 2F illustrated are exemplary time series planning, evaluation and prediction information that can be represented via an interactive user interface, in accordance with an embodiment of the present disclosure.

Figure 2A:
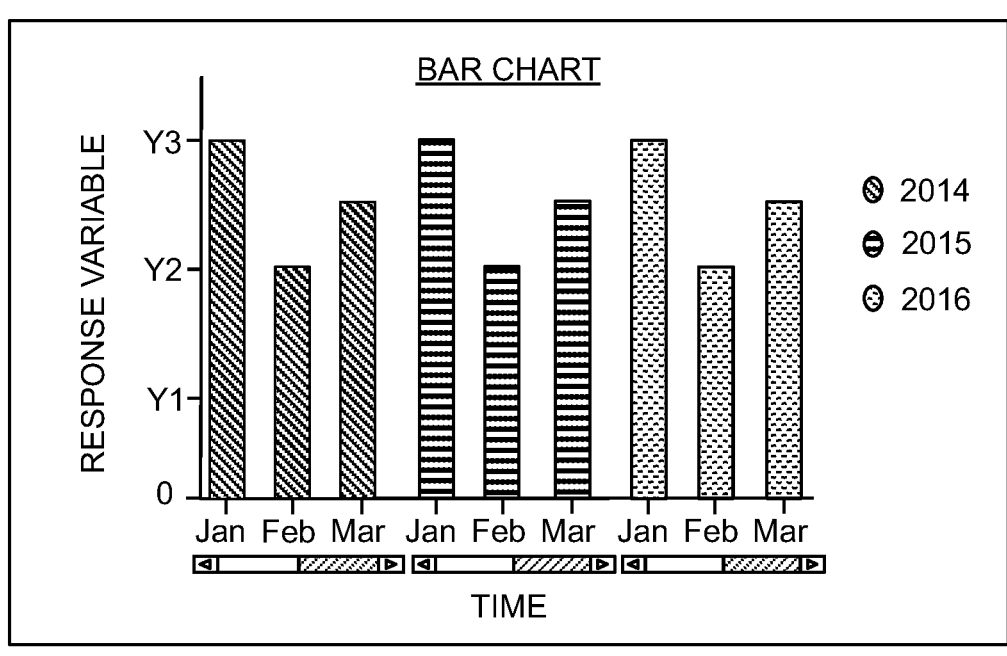

FIG. 2A depicts a bar chart which describes a distribution of data values of a response variable with respect to time period for which the data values of the response variable are to be obtained. The aforesaid bar chart pertains to time series planning information, and allows for a user to understand and analyse the response variable in a user-friendly manner. As shown, the horizontal axis of the bar chart depicts time (for example, such as, months January (Jan), February (Feb), March(Mar) and so on for years 2014, 2015 and 2016) for which the data values of the response variable are to be obtained, and the vertical axis of the bar chart depicts data values (for example, such as, Y1-Y3) of the response variable at a given time span.

Figure 2B:
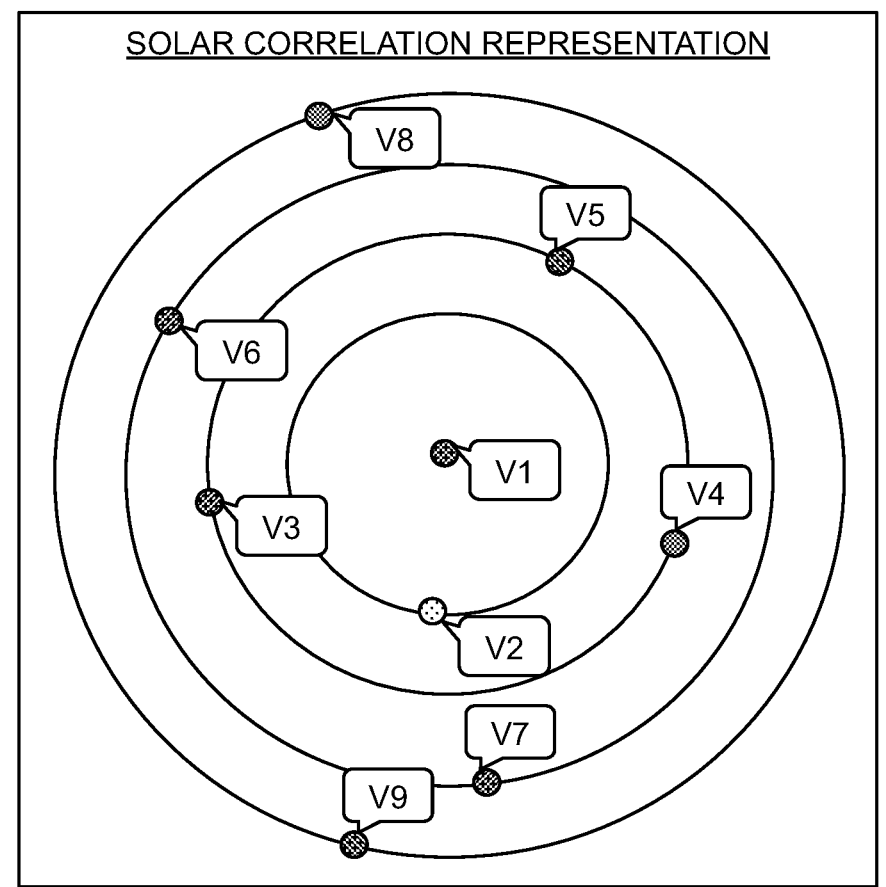

FIG. 2B is a solar correlation representation which depicts an impact of remaining variables V2, V3, V4, V5, V5, V6, V7, V8 and V9 of a set of variables V1-V9, on a variable of interest V1 selected from amongst the set of variables V1-V9. As shown, the solar correlation representation depicts the variable of interest V1 to be arranged at a centre of the solar correlation representation, and a plurality of concentric orbits around the variable of interest V1. Notably, each of the plurality of concentric orbits represents a distinct correlation coefficient. A given remaining variables is arranged in an orbit based upon a given correlation coefficient between the given remaining variables and the variable of interest V1. As shown, V1 is the variable of interest and V2, V3, V4, V5, V5, V6, V7, V8 and V9 are remaining variables. The plurality of concentric orbits could be arranged around the variable of interest V1 in a manner that a distance of a given orbit from the variable of interest V1 is inversely proportional to its corresponding correlation coefficient. In such a scenario, the orbit including the variables V2 would have a higher correlation coefficient as compared to the orbit including the variables V3, V4 and V5.

Furthermore, the orbit including variables V3, V4 and V5 would have a higher correlation coefficient as compared to the orbit including the variables V6 and V7. Moreover, the orbit including variables V6 and V7 would have a higher correlation coefficient as compared to the orbit including the variables V8 and V9.

Figure 2C:
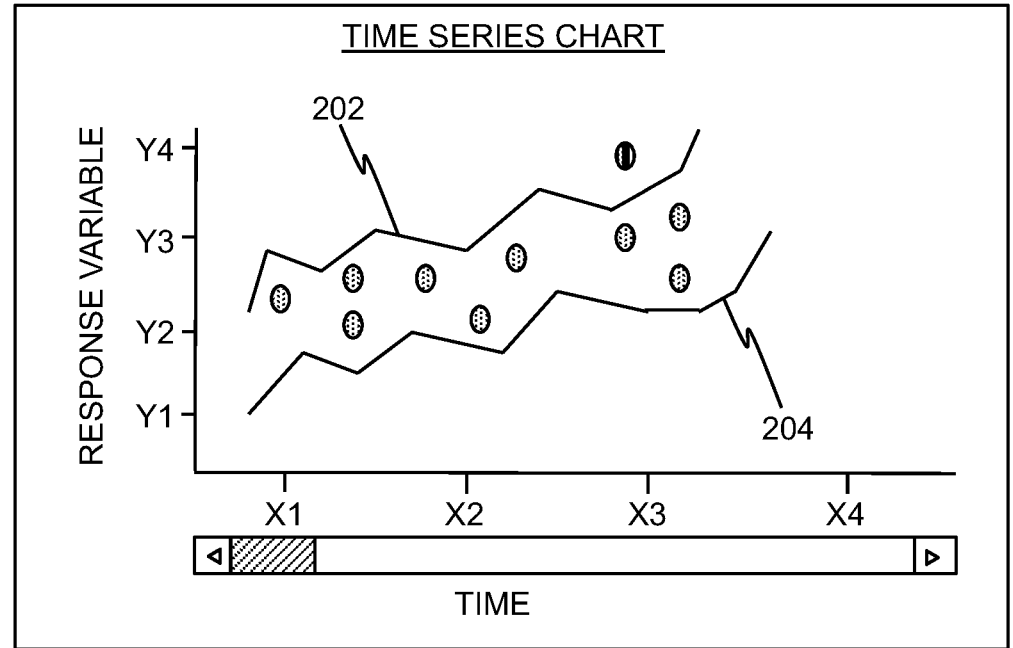

FIG. 2C depicts a time series chart which represents a variation of a given response variable with respect to time period for which the data values of the response variable are to be obtained. As shown, the vertical axis of the time series chart depicts values of the given response variable (for example, such as, Y1-Y4) and the horizontal axis of the time series chart depicts time period (for example, such as, X1-X4) for which the data values of the response variable are to be obtained. The time series chart depicts an upper acceptance bound 202 and a lower acceptance bound 204. Notably, samples that fall outside the upper acceptance bound 202 and the lower acceptance bound 204 are identified as key items that are required to be tested. In the time series chart, the identified key items are depicted as darkened circles whereas samples lying within the upper acceptance bound 202 and the lower acceptance bound 204 are depicted as light circles.

Figures 2D, 2E:
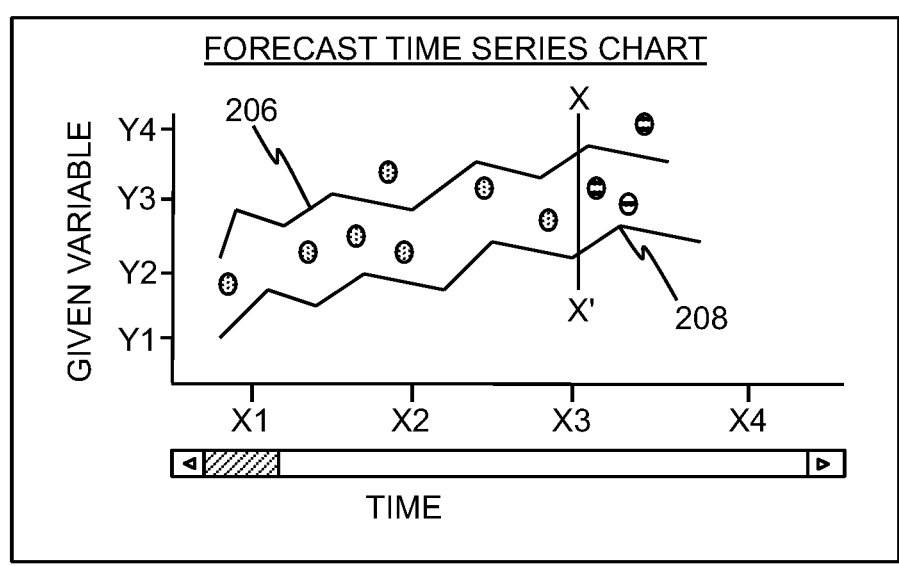

FIG. 2D depicts a forecast time series chart which represents a variation in a given variable with respect to time by way of a plurality of prior, current and forecasted data values of the given variable. The aforesaid forecast time series chart pertains to time series prediction information. As shown, the vertical axis of the forecast time series chart depicts values of the given variable (for example, such as, Y1-Y4) and the horizontal axis of the time series chart depicts time (for example, such as, X1-X4) for which the plurality of prior, current forecasted data values of the given variable are to be obtained. The forecast time series chart depicts an expected upper acceptance bound 206 and an expected lower acceptance bound 208. Notably, samples that fall outside the expected upper acceptance bound 206 and the expected lower acceptance bound 208 are identified as unexpected data values. In the forecast time series chart, the plurality of prior and current data values are depicted as light circles whereas the plurality of forecasted data values are depicted as darkened circles. As shown, the prior and current data values are separated from forecasted data values by way of a vertical line X-X'.

FIG. 2E depicts inputs that are to be obtained from a user, via the interactive user interface. The inputs comprise a plurality of audit parameters such as assurance level to be achieved, combined risk assessment (depicted as "CRA"), a tolerable error, a statistical sampling technique and a time period for which audit evidence is to be obtained. As shown, the assurance level can be provided by way of selection from a dropdown menu and/or adjustment of a slider. The combined risk assessment can be provided by way of selection from another dropdown menu. The value of tolerable error can be provided by the user entering a value in an input field. The statistical sampling technique can be selected via yet another dropdown menu. The time period (depicted as 'audit start time' and 'audit end time') can be provided by way of selection from still another dropdown menu. As shown, values of the audit start date and the audit end date can be provided by the user, by way of two another dropdown menus.

FIG. 2F depicts an optimisation option 210 that can be provided in the interactive user interface. Notably, the optimisation option 210 finds an optimal value of assurance level 212 that allow for minimizing an expected audit effort. The optimisation option 210 allows for obtaining: optimised upper acceptance bound and the lower acceptance bound 214, optimized number of key items 216, and an optimal sample size 218 of a number of remaining samples associated with the given use case, that are to be subsequently analysed for obtaining audit evidence.

It will be appreciated that FIGS. 2A-2F are merely examples, which should not unduly limit the scope of the claims herein. A person skilled in the art will recognize many variations, alternatives, and modifications of embodiments of the present disclosure.

Referring to FIG. 3, illustrated are steps of a method 300 of obtaining audit evidence, in accordance with an embodiment of the present disclosure. At a step 302, input data is obtained, the input data pertaining to a given use case for which the audit evidence is to be obtained. The input data is in a time structured form, wherein the input data comprises data values of a set of variables for a plurality of samples associated with the given use case. At a step 304, the input data is validated based upon a predefined set of statistical rules. At a step 306, a user is provided with an interactive user interface to enable the user to input a plurality of audit parameters to be employed for the audit evidence. Furthermore, the plurality of audit parameters comprising at least one of: an assurance level to be achieved, a tolerable error, a statistical sampling technique to be employed, a time period for which audit evidence is to be obtained, a level of data aggregation. At a step 308, a time series chart is generated to be presented to the user via the interactive user interface and an upper acceptance bound and a lower acceptance bound of data points are identified in the time series chart. The time series chart represents a variation in a response variable with respect to time. Furthermore, the time series chart is generated for the plurality of samples. Moreover, the upper acceptance bound and the lower acceptance bound are identified based upon the plurality of audit parameters and at least one explanatory variable. At a step 310, key items that are required to be tested, are identified from amongst the plurality of samples. The key items are samples that fall outside the upper acceptance bound and the lower acceptance bound in the time series chart.

The steps 302 to 310 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for executing time series planning, evaluation, and prediction to obtain audit evidence, the system comprising a server arrangement that includes a plurality of modules, wherein the modules comprise:

(a) a data input module configured to obtain input data pertaining to a given use case for which the audit evidence is to be obtained, wherein the input data is in a time structured form where the input data has a plurality of data items, where each data item of the plurality of data items has an associated sequence of characters or timestamp to identify a time related to a respective data item, and wherein the input data comprises data values of a set of variables for a plurality of samples associated with the given use case, wherein the input data is received from disparate and distributed data sources;

(b) a validation module configured to validate the input data based upon a predefined set of statistical rules, according to data type, data value, data structure, data consistency, data format, data accuracy and data rel-
evance of the input data from the disparate and distrib-
uted data sources;

(c) an interactive user interface module configured to
provide a user with an interactive user interface to
enable the user to input a plurality of audit parameters
to be employed for the audit evidence, the plurality of
audit parameters comprising: an assurance level to be
achieved, a tolerable error, a statistical sampling tech-
nique to be employed, a time period for which audit
evidence is to be obtained, and a level of data aggre-
gation, wherein the assurance level to be achieved
relates to a level of confidence that is to be achieved
pertaining to accuracy of given data values of a given
variable and a confidence level regarding absence of
misstatements within the given data values of the given
variable, and wherein the assurance level is provided
by the user via an adjustment of a slider on the
interactive user interface;

(d) a data analysis module configured to generate a time
series chart to be presented to the user via the interac-
tive user interface and identify an upper acceptance
bound and a lower acceptance bound of data points in
the time series chart, the time series chart representing
a variation in a response variable with respect to time
and is implemented on an x/y scatter plot having
coordinates (x, y), wherein x is a given time span and
y is a given data value of the response variable for the
given time span x, wherein the time series chart is
generated for the plurality of samples, and wherein the
upper acceptance bound and the lower acceptance
bound are identified based upon the plurality of audit
parameters and at least one explanatory variable,
wherein the at least one explanatory variable is at least
one of: a variable from the set of variables, an external
variable, and a time-dependent variable, wherein the
time series chart depicts a plurality of data points,
wherein each data point corresponds to data values of
the response variable for a given sample for a given
time period such that the time series chart depicts the
plurality of samples associated with the given use case,
and
    wherein the upper acceptance bound and the lower
    acceptance bound relate to a maximum and mini-
    mum acceptable limit of permissible misstatements
    within the plurality of samples that are acceptable
    while obtaining the audit evidence, wherein the
    server arrangement is configured to calculate the
    upper acceptance bound and the lower acceptance
    bound by employing a machine learning algorithm
    which is a function of the plurality of audit param-
    eters and the at least one explanatory variable; and
wherein the data analysis module is implemented by a
    configuration of field programmable gate arrays and
    reduced instruction set computers which are custom-
    design hardware configured to perform the time series
    chart generating step; and (e) an identification module configured to identify from
amongst the plurality of samples, key items that are
required to be tested, the key items being samples that
fall outside the upper acceptance bound and the lower
acceptance bound in the time series chart;

wherein the server arrangement is communicably coupled
to a user device, wherein the server arrangement via the
interactive user interface module, provides at least one
audit parameter from among the plurality of audit parameters to the user device, wherein the at least one
audit parameter is adjustable; and wherein the server arrangement is configured to itera-
tively perform (d) and (e) for the adjusted at least one
audit parameter, wherein the server arrangement is further configured to:
    automatically select a time period for which the audit
        evidence is to be obtained using an artificial intelli-
        gence algorithm;
    determine relationships existing between the variables
        of the set;
    enable, via the interactive user interface module, the
        user to select a variable of interest from the set of
        variables;
    use the data analysis module to determine an impact of
        remaining variables of the set on the variable of
        interest, based upon the relationships existing
        between the variables;
    represent, via the interactive user interface module, the
        impact of the remaining variables on the variable of
        interest;
    represent, via the interactive user interface module,
        interrelations that exist between the remaining vari-
        ables, wherein the impact of the remaining variables
        on the variable of interest is represented as a solar
        correlation representation on the interactive user
        interface, the solar correlation representation depict-
        ing the variable of interest arranged at a center of the
        solar correlation representation, and a plurality of
        concentric orbits around the variable of interest,
        wherein each of the plurality of concentric orbits
        represents a distinct correlation coefficient, and
        wherein a given remaining variable is arranged in an
        orbit based upon a given correlation coefficient
        between the given remaining variable and the vari-
        able of interest, wherein the solar correlation repre-
        sentation pertains to a time series planning operation
        associated with obtaining the audit evidence;
    use the data analysis module to:
        obtain forecast data for variation in data values of a
            given variable over a given future time period, the
            given variable being one variable among the set of
            variables;
        generate a forecast time series chart to be presented
            to the user via the interactive user interface and
            identify an expected upper acceptance bound and
            an expected lower acceptance bound of data points
            in the forecast time series chart, the forecast time
            series chart representing a variation in the given
            variable with respect to time by way of a plurality
            of prior, current and forecasted data values of the
            given variable, wherein the expected upper accep-
            tance bound and the expected lower acceptance
            bound are to be identified based upon the plurality
            of audit parameters and at least one forecasting
            variable, the at least one forecasting variable being
            at least one of: an external variable and a time-
            dependent variable;
        identify unexpected data values from amongst the
            plurality of forecasted data values of the given
            variable, the unexpected data values being data
            points that fall outside the expected upper accep-
            tance bound and the expected lower acceptance
            bound in the forecast time series chart;
        determine an objective prediction for the given vari-
            able, the objective prediction comprising predicted data values of the given variable over the given future time period; and determine an average prediction error for the forecast data, based upon the objective prediction;

represent, via the interactive user interface module, the maximum achievable assurance level for the data values of the given variable over the given future time period, based upon the average prediction error for the forecast data;

provide an optimization option in the interactive user interface that, when selected by the user, optimizes the plurality of audit parameters to optimize the assurance level by determining an optimal balance between a number of key items to be tested and a sample size to be subsequently analyzed, wherein the optimization option generates an optimal time series chart having an optimal number of key items, and wherein the optimization option is triggered by the user by using at least one of a user-selectable icon, a user selectable button and a dropdown menu;

achieve stochastic noise reduction by calculating correlation coefficients between the variables of the set to determine the relationships existing therebetween; and automatically select the time period for which the audit evidence is to be obtained by using the artificial intelligence algorithm.

2. A method for obtaining audit evidence, the method comprising using a system that provides time series planning, evaluation and prediction, wherein the system comprises a server arrangement, and wherein the method comprises:

(i) using a data input module of the system to obtain input data pertaining to a given use case for which the audit evidence is to be obtained, wherein the input data is in a time structured form, where the input data has a plurality of data items, where each data item of the plurality of data items has an associated sequence of characters or timestamp to identify a time related to the respective data item, and wherein the input data comprises data values of a set of variables for a plurality of samples associated with the given use case, wherein the input data is received from disparate and distributed data sources;

(ii) using a validation module to validate the input data based upon a predefined set of statistical rules, according to data type, data value, data structure, data consistency, data format, data accuracy and data relevance of the input data from the disparate and distributed data sources;

(iii) using an interactive user interface module to provide a user with an interactive user interface to enable the user to input a plurality of audit parameters to be employed for the audit evidence, the plurality of audit parameters comprising: an assurance level to be achieved, a tolerable error, a statistical sampling technique to be employed, a time period for which audit evidence is to be obtained, and a level of data aggregation, wherein the assurance level to be achieved relates to a level of confidence that is to be achieved pertaining to accuracy of given data values of a given variable and a confidence level regarding absence of misstatements within the given data values of the given variable, and wherein the assurance level is provided by the user via an adjustment of a slider on the interactive user interface;

(iv) using a data analysis module to generate a time series chart to be presented to the user via the interactive user interface module and identify an upper acceptance bound and a lower acceptance bound of data points in the time series chart, wherein the time series chart represents a variation in a response variable with respect to time and is implemented on an x/y scatter plot having coordinates (x,y), wherein x is a given time span and y is a given data value of the response variable for the given time span x, wherein the time series chart is generated for the plurality of samples, the upper acceptance bound and the lower acceptance bound being identified based upon the plurality of audit parameters and at least one explanatory variable, wherein the at least one explanatory variable is at least one of: a variable from the set of variables, an external variable, and a time-dependent variable, wherein the time series chart depicts a plurality of data points, wherein each data point corresponds to data values of the response variable for a given sample for a given time period such that the time series chart depicts the plurality of samples associated with the given use case, and wherein the upper acceptance bound and the lower acceptance bound relate to a maximum and minimum acceptable limit of permissible misstatements within the plurality of samples that are acceptable while obtaining the audit evidence, wherein the server arrangement is configured to calculate the upper acceptance bound and the lower acceptance bound by employing a machine learning algorithm which is a function of the plurality of audit parameters and the at least one explanatory variable; and wherein the data analysis module is implemented by a configuration of field programmable gate arrays and reduced instruction set computers which are custom-design hardware configured to perform the time series chart generating step; and (v) using the data analysis module to identify, from amongst the plurality of samples, key items that are required to be tested, the key items being samples that fall outside the upper acceptance bound and the lower acceptance bound in the time series chart;

wherein the system is communicably coupled to a user device, wherein the system via the interactive user interface module, provides at least one audit parameter from among the plurality of audit parameters to the user device, wherein the at least one audit parameter is adjustable; and wherein the system iteratively performs (iv) and (v) for the adjusted at least one audit parameter; and wherein the method further comprises automatically selecting time period for which the audit evidence is to be obtained using an artificial intelligence algorithm;

wherein the server arrangement is configured to:

determine relationships existing between the variables of the set;

enable, via the interactive user interface module, the user to select a variable of interest from the set of variables;

use the data analysis module to determine an impact of remaining variables of the set on the variable of interest, based upon the relationships existing between the variables;

represent, via the interactive user interface module, the impact of the remaining variables on the variable of interest;

represent, via the interactive user interface module, interrelations that exist between the remaining variables, wherein the impact of the remaining variables on the variable of interest is represented as a solar correlation representation on the interactive user interface, the solar correlation representation depicting the variable of interest arranged at a center of the solar correlation representation, and a plurality of concentric orbits around the variable of interest, wherein each of the plurality of concentric orbits represents a distinct correlation coefficient, and wherein a given remaining variable is arranged in an orbit based upon a given correlation coefficient between the given remaining variable and the variable of interest, and wherein the solar correlation representation pertains to a time series planning operation associated with obtaining the audit evidence;

wherein the server arrangement is further configured to:
use the data analysis module to:
obtain forecast data for variation in data values of a given variable over a given future time period, the given variable being one variable among the set of variables;
generate a forecast time series chart to be presented to the user via the interactive user interface and identify an expected upper acceptance bound and an expected lower acceptance bound of data points in the forecast time series chart, the forecast time series chart representing a variation in the given variable with respect to time by way of a plurality of prior, current and forecasted data values of the given variable, wherein the expected upper acceptance bound and the expected lower acceptance bound are to be identified based upon the plurality of audit parameters and at least one forecasting variable, the at least one forecasting variable being at least one of: an external variable and a time-dependent variable;
identify unexpected data values from amongst the plurality of forecasted data values of the given variable, the unexpected data values being data points that fall outside the expected upper acceptance bound and the expected lower acceptance bound in the forecast time series chart;
determine an objective prediction for the given variable, the objective prediction comprising predicted data values of the given variable over the given future time period; and
determine an average prediction error for the forecast data, based upon the objective prediction;
represent, via the interactive user interface module, the maximum achievable assurance level for the data values of the given variable over the given future time period, based upon the average prediction error for the forecast data;
provide an optimization option in the interactive user interface that, when selected by the user, optimizes the plurality of audit parameters to optimize the assurance level by determining an optimal balance between a number of key items to be tested and a sample size to be subsequently analyzed, wherein the optimization option generates an optimal time series chart having an optimal number of key items, and wherein the optimization option is triggered by the user by using at least one of a user-selectable icon, a user selectable button and a dropdown menu;

achieve stochastic noise reduction by calculating correlation coefficients between the variables of the set to determine the relationships existing therebetween; and
automatically select the time period for which the audit evidence is to be obtained by using the artificial intelligence algorithm.

3. A software product comprising a non-transitory machine-readable data storage medium having stored thereon program instructions that, when accessed by a processing device, cause the processing device to carry out a method for obtaining audit evidence, the method comprising using a system that, when in operation, provides time series planning, evaluation and prediction, wherein the system comprises a server arrangement, and wherein the method comprises:
(i) using a data input module of the system to obtain input data pertaining to a given use case for which the audit evidence is to be obtained, wherein the input data is in a time structured form, where the input data has a plurality of data items, where each data item of the plurality of data items has an associated sequence of characters or timestamp to identify a time related to the respective data item, and wherein the input data comprises data values of a set of variables for a plurality of samples associated with the given use case, wherein the input data is received from disparate and distributed data sources;
(ii) using a validation module to validate the input data based upon a predefined set of statistical rules, according to data type, data value, data structure, data consistency, data format, data accuracy and data relevance of the input data from the disparate and distributed data sources;
(iii) using an interactive user interface module to provide a user with an interactive user interface to enable the user to input a plurality of audit parameters to be employed for the audit evidence, the plurality of audit parameters comprising: an assurance level to be achieved, a tolerable error, a statistical sampling technique to be employed, a time period for which audit evidence is to be obtained, and a level of data aggregation, wherein the assurance level to be achieved relates to a level of confidence that is to be achieved pertaining to accuracy of given data values of a given variable and a confidence level regarding absence of misstatements within the given data values of the given variable, and wherein the assurance level is provided by the user via an adjustment of a slider on the interactive user interface;
(iv) using a data analysis module to generate a time series chart to be presented to the user via the interactive user interface module and identify an upper acceptance bound and a lower acceptance bound of data points in the time series chart, wherein the time series chart represents a variation in a response variable with respect to time and is implemented on an x/y scatter plot having coordinates (x,y), wherein x is a given time span and y is a given data value of the response variable for the given time span x, wherein the time series chart is generated for the plurality of samples, the upper acceptance bound and the lower acceptance bound being identified based upon the plurality of audit parameters and at least one explanatory variable, wherein the at least one explanatory variable is at least one of: a variable from the set of variables, an external variable, and a time-dependent variable, wherein the time series chart depicts a plurality of data points wherein each data point corresponds to data values of the response variable for a given sample for a given time period such that the time series chart depicts the plurality of samples associated with the given use case, and wherein the upper acceptance bound and the lower acceptance bound relate to a maximum and minimum acceptable limit of permissible misstatements within the plurality of samples that are acceptable while obtaining the audit evidence, wherein the server arrangement is configured to calculate the upper acceptance bound and the lower acceptance bound by employing a machine learning algorithm which is a function of the plurality of audit parameters and the at least one explanatory variable; and wherein the data analysis module is implemented by a configuration of field programmable gate arrays and reduced instruction set computers which are custom-design hardware configured to perform the time series chart generating step; and (v) using the data analysis module to identify, from amongst the plurality of samples, key items that are required to be tested, the key items being samples that fall outside the upper acceptance bound and the lower acceptance bound in the time series chart;

wherein the system is communicably coupled to a user device, wherein the system via the interactive user interface module, provides at least one audit parameter from among the plurality of audit parameters to the user device, wherein the at least one audit parameter is adjustable; and wherein the system iteratively performs (iv) and (v) for the adjusted at least one audit parameter; and wherein the method further comprises automatically selecting time period for which the audit evidence is to be obtained using an artificial intelligence algorithm;

wherein the server arrangement is configured to;

determine relationships existing between the variables of the set;

enable, via the interactive user interface module, the user to select a variable of interest from the set of variables;

use the data analysis module to determine an impact of remaining variables of the set on the variable of interest, based upon the relationships existing between the variables;

represent, via the interactive user interface module, the impact of the remaining variables on the variable of interest;

represent, via the interactive user interface module, interrelations that exist between the remaining variables, wherein the impact of the remaining variables on the variable of interest is represented as a solar correlation representation on the interactive user interface, the solar correlation representation depicting the variable of interest arranged at a center of the solar correlation representation, and a plurality of concentric orbits around the variable of interest, wherein each of the plurality of concentric orbits represents a distinct correlation coefficient, and wherein a given remaining variable is arranged in an orbit based upon a given correlation coefficient between the given remaining variable and the variable of interest, wherein the solar correlation representation pertains to a time series planning operation associated with obtaining the audit evidence;

wherein the server arrangement is further configured to:

use the data analysis module to:

obtain forecast data for variation in data values of a given variable over a given future time period, the given variable being one variable among the set of variables;

generate a forecast time series chart to be presented to the user via the interactive user interface and identify an expected upper acceptance bound and an expected lower acceptance bound of data points in the forecast time series chart, the forecast time series chart representing a variation in the given variable with respect to time by way of a plurality of prior, current and forecasted data values of the given variable, wherein the expected upper acceptance bound and the expected lower acceptance bound are to be identified based upon the plurality of audit parameters and at least one forecasting variable, the at least one forecasting variable being at least one of: an external variable and a time-dependent variable;

identify unexpected data values from amongst the plurality of forecasted data values of the given variable, the unexpected data values being data points that fall outside the expected upper acceptance bound and the expected lower acceptance bound in the forecast time series chart;

determine an objective prediction for the given variable, the objective prediction comprising predicted data values of the given variable over the given future time period; and determine an average prediction error for the forecast data, based upon the objective prediction; and represent, via the interactive user interface module, the maximum achievable assurance level for the data values of the given variable over the given future time period, based upon the average prediction error for the forecast data;

provide an optimization option in the interactive user interface that, when selected by the user, optimizes the plurality of audit parameters to optimize the assurance level by determining an optimal balance between a number of key items to be tested and a sample size to be subsequently analyzed, wherein the optimization option generates an optimal time series chart having an optimal number of key items, and wherein the optimization option is triggered by the user by using at least one of a user-selectable icon, a user selectable button and a dropdown menu;

achieve stochastic noise reduction by calculating correlation coefficients between the variables of the set to determine the relationships existing therebetween; and automatically select the time period for which the audit evidence is to be obtained by using the artificial intelligence algorithm.

* * * * *